United States Patent [19]

Jonsson

[11] Patent Number: 5,555,553
[45] Date of Patent: Sep. 10, 1996

[54] METHOD FOR SUPPORTING COMMUNICATION IN A COMMUNICATION SYSTEM USING INTERMEDIARIES BETWEEN CALLED PARTIES

[75] Inventor: Björn E. R. Jonsson, Järfälla, Sweden

[73] Assignee: Telefonaktiebolaget LM Ericsson, Stockholm, Sweden

[21] Appl. No.: 18,213

[22] Filed: Feb. 16, 1993

[30] Foreign Application Priority Data

Feb. 17, 1992 [SE] Sweden .................................. 9200465

[51] Int. Cl.$^6$ .......................... H04M 3/42; H04M 11/00; H04M 7/00
[52] U.S. Cl. .......................... 379/214; 379/58; 379/207; 379/218; 379/229
[58] Field of Search .................... 379/56, 58, 59, 379/60, 61, 63, 201, 207, 210, 214, 218, 229

[56] References Cited

U.S. PATENT DOCUMENTS

| | | | |
|---|---|---|---|
| 4,172,969 | 10/1979 | Levine et al. | 379/97 X |
| 4,763,191 | 8/1988 | Gordon et al. | 379/201 X |
| 4,899,375 | 2/1990 | Bauer et al. | 379/264 |
| 4,910,766 | 3/1990 | Ogino et al. | 379/201 |
| 4,933,966 | 6/1990 | Hird et al. | 379/132 |
| 5,027,387 | 6/1991 | Moll | 379/225 X |
| 5,090,051 | 2/1992 | Muppidi | 379/63 X |

FOREIGN PATENT DOCUMENTS

| | | |
|---|---|---|
| 0140351 | 5/1985 | European Pat. Off. . |
| 0435449 | 7/1991 | European Pat. Off. . |
| WO89/10044 | 10/1989 | WIPO . |
| WO92/01350 | 1/1992 | WIPO . |

*Primary Examiner*—Jeffery Hofsass
*Assistant Examiner*—Harry S. Hong
*Attorney, Agent, or Firm*—Burns, Doane, Swecker & Mathis, L.L.P.

[57] ABSTRACT

A method and a system for supporting communication for a first user who desires to be able to communicate with second foreign users in an environment in which communication can take place via several different telecommunication networks. The first user in each telecommunication network has an address which is used by the foreign users when making a call. The calls which use this address instead of being terminated by the user are terminated by an intermediary. The intermediary communicates as the receiving party to the calling party, in accordance with predetermined instructions given by the first user. The intermediary either performs an predetermined procedure or establishes communication with the first user in accordance with the instructions given. The user is therewith afforded the possibility of taking a dynamic position with regard to how each call shall be dealt with.

27 Claims, 9 Drawing Sheets

METHOD FOR SUPPORTING COMMUNICATION IN A COMMUNICATION SYSTEM USING INTERMEDIARIES BETWEEN CALLED PARTIES

TECHNICAL FIELD

The present invention relates to a method and an arrangement for supporting communication.

More specifically, the invention relates to a method and an arrangement for supporting communication for a first user who desires the possibility of communicating with other, foreign users in an environment in which communication can take place through the intermediary of several different communication networks, wherein the first user in each telecommunication network has an address which is used by the foreign to make calls.

The present invention is related to the following five copending patent applications:
1) "A Method of Producing an Intelligent Network Service", U.S. patent application No. 08/018,197;
2) "A Method of Establishing a Connection", U.S. patent application No. 08/018,214;
3) "A Method of Organizing Communication", U.S. patent application No. 08/018,223.
4) "A Method of Establishing Cooperation Functionality", U.S. patent application No. 08/018,268; and
5) "A Paging Method", U.S. patent application No. 08/018,212.

These applications are enclosed as an annex to the present description and describe mechanisms which can be used in the method according to the present invention.

TECHNICAL BACKGROUND ART

The term communication services is meant to mean conventional telephony services, telex services, datapack services, datel services, telefax services, videotext services, ISDN-services, mobile telephony services, personal paging services, tele-point-services and general communication between two or more parties. The services recited above are only examples of the services possible and are not intended to limit the scope of the invention.

The term telecommunication network is normally meant to mean the telephone networks, telex networks, circuit connected data networks, picture information transfer networks, private telecommunication networks, radio networks, satellite communication networks and general carriers of the communication services, such as analog transmission, digital transmission, synchronous, multiplex or asynchronous multiplex transmission, ATM, etc., for example. These networks are recited solely by way of example and the invention is not restricted thereto.

The term functionality is meant to mean the ability to perform an operation in a telecommunication network. Examples of functionality include activities and services that can be performed in the telecommunication network. Examples of functionalities include an enquiry to establish a connection path or route between two parties, digit analysis, billing or ticketing. Although not necessary, the functionality may require the availability of dedicated equipment for carrying out the functionality. For instance, if the functionality is to receive tones and to analyze tones, it is necessary to make a tone receiver accessible. Other examples of functionalities include voice-controlled speech information, number translation service, conference calls.

Other examples of functionality include the functionalities described in the aforesaid five Swedish patent applications, namely communication in the form of a meeting, personal paging, a method of establishing cooperation with a functionality, meeting connection establishment and communication via intermediaries. Still another example of functionality is the ability of being able to choose from among several alternatives. By functionality is also meant those services and activities possessed by the intermediary described below, also called electronic secretary.

The term connection is meant to mean a circuit-coupled connection or a package-coupled connection. The term to establish a connection is meant to mean in the circuit coupled case that a circuit-coupled connection is established between two hardware terminal devices (or equipment) and in the package coupled case it is meant that a package coupled connection creates relationships between logic channels on node-interconnecting physical links which.

The term to originate or to terminate a connection is meant to mean in the circuit-coupled case to connect originating or terminating equipment to a circuit-coupled connection, and in the package-coupled case to create a session between applications in originating and terminating nodes respectively.

The term user is meant to mean in the following a human user or a computer-based application which utilizes communication services. The application may be achieved with hardware, software and combinations thereof. The word "party" is synonymous with the term user.

The term terminal is meant to mean equipment which is connected to a telecommunication network and which makes the telecommunication services of the network available to a user.

The term port either refers to an access port or to a transit port. An access port is a location where a dedicated terminal is connected to a telecommunication network. An access port is associated with a destination address which goes to an end user. In the case of a standard telephone network, the access ports are located in a telephone station. In the case of the ISDN-network and the mobile telephone network, the access ports are found in a terminal. A transit port is a port in a connection between nodes. A transit port is not associated with any particular destination address, and can be used to establish any selected connection with a final destination. The final destination is given by the destination address. A transit port can transfer a call to another node or can receive a call from another node.

The final destination of a call is a terminal which is identified by a destination identity. The terminal can be present in the same node as a transit port or in some other node to which the call shall be further connected.

One drawback with present-day telecommunication methods is that a call from a party A to a party B is always associated with the establishment of a connection route from A to B. Call and establishment of a connection route is a continuous process. This means that the ability of both parties to influence the communication phase of the connection is extremely limited. Among other things, this means that on the part of A the call must be made in real time, and means that when the call is signalled, party B can only choose between two alternatives, namely either to reject or to accept the call.

In present-day communication networks, each party has an addressee or destination identity, in the following shortened to destination-ID, which are mutually identical irrespective of whether the party concerned is an originating or a terminating user. By destination-ID is meant, for instance, telephone number, electronic-mail-address, telex number, telefax number, etc.

If one party is an authorized user in several different telecommunication networks, the party will have a different destination-ID in each network. The fact that one party may be authorized in several different networks should mean, in principle, that the party is readily accessible to foreign users. However, in order to establish a connection with a party which is authorized in several different networks, it is necessary for a foreign user (1) to know in which networks party B is authorized;
(2) to look in the telephone directory for the chosen network concerned, in order to find B's destination-ID;
(3) if party B is engaged in the network in which A first makes a call, it is necessary for A to look for B in network after network until the call reaches B; and
(4) to redirect B's destination-ID himself, when possible. This is illustrated by the following examples. A calls B through the electronic-mail-network and finds that B is not logged in this network. A now chooses, instead, to send his electronic-mail-message to B by telefax. A accordingly sends his electronic-mail-message to B and gives B's fax- destination-ID as the destination address.

Another drawback associated with the fact that a call from A to B is a continuous process, occurs when B is mobile, changes his place of residence, etc.

When the system concerned is a conventional telephony system, it is possible in the case of certain networks for a mobile user to redirect the telephony service. This involves redirecting the user's normal destination-ID, for instance the telephone number of the user's main office, to another destination-ID, normally belonging to another user, e.g. a department office. When a foreign user calls while using a normal destination-ID, the telephone in the department office will ring. The user himself is obliged to initiate this redirection and must, himself, cancel the same. When the user is an authorized user in many telecommunication networks and this redirection shall take place in all of said networks, it is necessary for the user to maintain accurate bookwork in respect of each redirection and its cancellation in respective networks.

When seen from the aspect of the network, such redirection constitutes a problem, since it is necessary for the network to be aware of the new destination-identity. Expressed another way, it is necessary for the network to keep a check on the mobile user. In a mobile telephony network, a user has a mobile terminal as a fixed address and the network obtains continuous information as to where the fixed address is located geographically in the network. This enables a foreign caller to always be able to call the mobile terminal, irrespective of where the terminal is located within the area covered by the mobile telephone network. The technical solutions applied within mobile telephony to enable communication for mobile users is highly complex and the hardware and software used is highly specialized. The hardware and the software are highly integrated so as to constitute a solution to the total problem of enabling communication for mobile users. The following examples illustrate the procedures that hardware components and software components must be capable of carrying out:

(a) detection of a call from A to B;
(b) localizing B;
(c) ringing B so as to alert B that A desires contact;
(d) decide whether B accepts/rejects/requires redirection of the communication desired by A; and
(e) establish the relevant connections through the network.

Another drawback with present-day communication services is that a user obtains access to services through the medium of separate telecommunication networks having different access methods and also having terminals which are of mutually different natures, depending on respective networks. For example, the telex service can only be obtained by using a telex apparatus, the telefax service can only be obtained through a telefax machine, the mobile telephony service can only be obtained via a mobile telephone, the data communication service can only be obtained with the aid of a computer and a modem, the telephony service can only be obtained through a telephone apparatus, etc. A so-called short number which is used in one network to call a subscriber differs from a short number used in another network to call the same subscriber.

Still another drawback of present-day telecommunication services is that a user who is engaged with a connection in one telecommunication network can scarcely be engaged in the communication phase of a connection in another network, for practical reasons.

Devices for receiving and storing messages are known to the art. One such device is known under the name "Voice Response" and enables customers to order, obtain information, book, etc., from their own telephone twenty-four hours a day. Another known device of this kind is called "Voice Mail". This device answers and receives messages when the customer is not able to do this himself. The customer is able to listen to Voice Mail and to reply to the messages from any telephone whatsoever throughout the world. Another known device is called "Voice Operator". This device always answers at the first signal and offloads the user's exchange and also makes it easier for the foreign user to arrive at the correct person. Another known device is called "Audiotex" and is a telephone service resembling video text.

All of these known devices serve as message storage sites. The storage site, or location, is stationary in the respective networks in which it is found. Stored messages can only be collected by the customer if the customer is found in the same network as the device. When a customer has several such storage devices in several different networks, it is necessary for the customer to check each of the devices by calling the storage devices, each in turn, while stating respective destination addresses. Even though no device has a message stored therein, it is still necessary for the customer to check the storage device, in all cases, in order to ascertain whether or not a message is stored in respective devices.

Another drawback with these known storage devices is that the message which a foreign user wishes to give to the customer, i.e., the owner of the storage device, is always steered to a predetermined, given place, where it is stored. Some known storage devices deliver an alert-signal to the customer each time a message is stored. "Communication" between the foreign user and the customer is terminated therewith. In order for something to happen with the message, it is up to the customer to take the next step, i.e., to contact the place or location at which the message is stored, and to collect the message therefrom.

Communication traditionally involves establishing connections between starting points from the originating party in a direction towards the destination stated when making the call. This traditional procedure of establishing connections will sometimes result in restrictions, for instance when the party to which the call is addressed is mobile, in which case it is necessary for the network to keep a check on the location of the addressed party in the network. If the addressed party uses several different telecommunication networks and is mobile, there is at present no possibility of the originating party to establish communication with the mobile party through a call, since the originating party is unaware of the communication network used by the mobile party at that particular time, i.e., at the time of making the call.

U.S. Pat. No. 4,172,969 relates to a communication system comprising a telephone connected to a stationary telephone answering machine. A stationary radio transmitter and a stationary radio receiver are connected to the answering machine. A mobile radio transmitter and receiver unit is carried by a subscriber of the telephone, allowing the subscriber to take and to make calls when he is mobile. The system operates in the following way: Party A places a call to party B. The call is terminated by B:s answering machine which requests the caller, party A, to dial his telephone number. The telephone answering machine now triggers the stationary radio transmitter which alerts B:s mobile radio receiver. Suitable devices connected to the answering machine will simultaneously convert A:s telephone number into digital form. The telephone number modulates the stationary transmitter and is broadcasted, together with the alert, to B:s mobile radio receiver which now beeps and displays the calling party's telephone number. Party A may either promptly telephone back to party A or may store the transferred A-number into memory storage for retrieval at a later time. To provide a "real time" acknowledgement to the calling party A, notifying the calling party that the call and the calling number has been received the mobile transmitter transmits, to the stationary receiver at the answering machine, an acknowledgement signal that triggers the answering machine to play back a prerecorded message to the caller via the stationary telephone, informing the caller that the phone call has been received by the called party B along with the calling party's telephone number and that a return telephone call will be made.

This previously known communication system operates well for its intended purpose but has the drawback that the calling party must hang up and await a return call from the called party B. Accordingly the calling party must follow a very specific call procedure in order to communicate: he must first dial the B:number, then dial his own number, then hang up and wait for a return call. This is awkward.

In contrast to U.S. Pat. No. 4,172,969 in the present invention, the call from the calling party is parked at the intermediary, the intermediary alerts the called party, and the called party makes a decision to accept or to reject the call. If the call is accepted the called party is connected with the parked call and the calling party does not need to dial his number. Accordingly the intermediary is transparent to the caller-transparent in the sense that the calling party does not notice that an intermediary has been involved in the setup of the call. If the call is rejected by the called party, only in this situation, the calling party has to identify himself to the intermediary. When the called party later wants to communicate with the calling party the called party makes a call to his intermediary, not to the calling party as is taught by U.S. Pat. No. 4,172,969.

DISCLOSURE OF THE INVENTION

An object of the present invention is to provide a communication method and an arrangement which will reduce the aforesaid drawbacks, by breaking the continuous communication between one party, called F, and another party, called U, in two communications, namely a communication between F and an intermediary, called ES, and another communication between U and the intermediary ES.

Distinct from the traditional terminology in which A is normally designated the originating party and B the addressed party, the party served by the intermediary ES is designated U, where U stands for customer. The foreign party who wishes to communicate with U via the intermediary is designated F. The designations U and F are independent of which party takes the initiative in establishing communication between U and F. Thus, party U may sometimes originate a connection, sometimes terminate a connection. The same applies to party F.

A further object of the present invention is to provide a communication method and an arrangement which will provide the customer U with several choices with regard to how he shall be affected by an incoming call. The customer U shall be able to meet different foreign users F in different ways, all according to U's own desires.

Another object of the present invention is to provide a communication method and a system which will enable the customer U to obtain access, to telecommunication services in several different telecommunication networks in which the customer U is authorized through one and the same terminal.

Still another object of the invention is to provide a communication method and a system which will release the telecommunication network from the function of having knowledge of the temporary destination addresses of mobile users, by handling incoming traffic with the aid of an intermediary ES which is stationary in relation to U. This enables U to move from place to place in a telecommunication network, and also from network to network while the intermediary is stationary. When necessary, the stationary intermediary shall be able to move from one location to another. The intermediary ES is addressed with the aid of the destination-ID of the customer U. Each mobile user communicates with its respective intermediary, by making an outgoing call through any selected telecommunication network and any selected terminal. By "any selected", it is meant the terminal or the telecommunication network which is available when the mobile user wishes to manifest his desire to establish communication with a foreign user by making an outgoing call to his intermediary ES.

Yet another object of the invention is to provide a telecommunication method and a system which utilizes (i) a first destination-ID, which is abbreviated to D-ID, which is used by foreign users F to achieve contact with the customer U via the intermediary; and (ii) a second identity, hereinafter designated customer-ID, abbreviated to U-ID, which is used by the customer U to achieve contact with his intermediary ES.

Still another object of the invention is to provide a communication method and an arrangement which will enable the customer U to create a personal catalogue or directory of intermediaries ES, in which directory each of the foreign users F chosen by U is assigned a respective single, freely selected short-destination-ID, irrespective of the individual destination-IDs which the foreign user has in the various telecommunication networks used by him. With the aforesaid freely-chosen short-destination-ID, the customer U is able to address the foreign user in any telecommunication network chosen from among the networks over which the foreign user has access.

Still another object of the invention is to provide a communication method and a system which will enable the customer U and the intermediary ES with which the customer U communicates to handle several connections and several calls simultaneously, from and to several foreign users F over different telecommunication networks.

Yet another object of the invention is to provide a telecommunication method and a system with which foreign users need not be aware of the location of the telecommunication network in which a customer U called at that moment in time, and need not be aware of how the called customer U moves between the telecommunication networks.

The invention also relates to the provision of a communication method and a system which will enable the intermediary to be implemented in a service node which, at the same time, may be equipped with a plurality of intermediaries which serve a corresponding number of other customers U. This will result in a pool of intermediaries in a service node.

It is also the intention of the present invention to provide a communication method which will enable the functionality performed by an intermediary to be distributed geographically in a network and to enable each such distributed intermediary to be similarly distributed in several telecommunication networks.

The invention also relates to a communication method and a system which will enable the intermediary to create a reference F-REC-REF to each intermediary which is directed to a customer.

The invention is also intended to provide a communication method in which a communication process between a foreign user and a customer, via an intermediary, is treated as a transaction which is commenced when either party takes a first initiative to call the other party and which is not terminated until all parties, comprising the foreign user F, the customer U and its intermediary ES, are all agreed that the communication process can be terminated.

The communication process shall be able to proceed through a sequence of connections and one-way messages between the parties concerned with pauses of varying lengths between the contacts. It shall be possible for the parties to move to other telecommunication networks and other terminals between consecutive contacts. During an ongoing interactive contact, the parties shall be able to switch telecommunication networks and, at the same time, shall be able to communicate with one another in several different telecommunication networks. If some form of conversion is required, it is then necessary for communication to take place through the appropriate conversion functionality, so-called gate-way.

The invention is also intended to provide a communication method in which the intermediary is able to choose a message storage site from among several different storage sites.

One and the same network may include several storage sites and each network may have one or more message storage sites. The intermediary shall be able to choose a message storage site with regard to where the foreign user is located and also with regard to where the customer is located geographically. The foreign user who wishes to deliver a message to U shall be able to do so either to U's intermediary ES or to some other storage site in a selective network, and the intermediary ES shall be aware of the location of a storage site for an individual message, referred to by said reference F-REC-REF.

The invention is also intended to provide a communication method which is selectively two-way, which means that the customer may instruct his intermediary to receive and to send messages respectively from and to an individual foreign user. In other words, the intermediary can be given "intelligence", i.e. the functionality which will enable it to adapt itself to the customer's instructions.

The features characteristic of the present invention are set forth in the following claims.

BRIEF DESCRIPTION OF THE DRAWINGS

The invention will now be described in more detail with reference to the accompanying drawings, in which.

DETAILED DESCRIPTION OF THE DISCLOSURE

Figure 1:
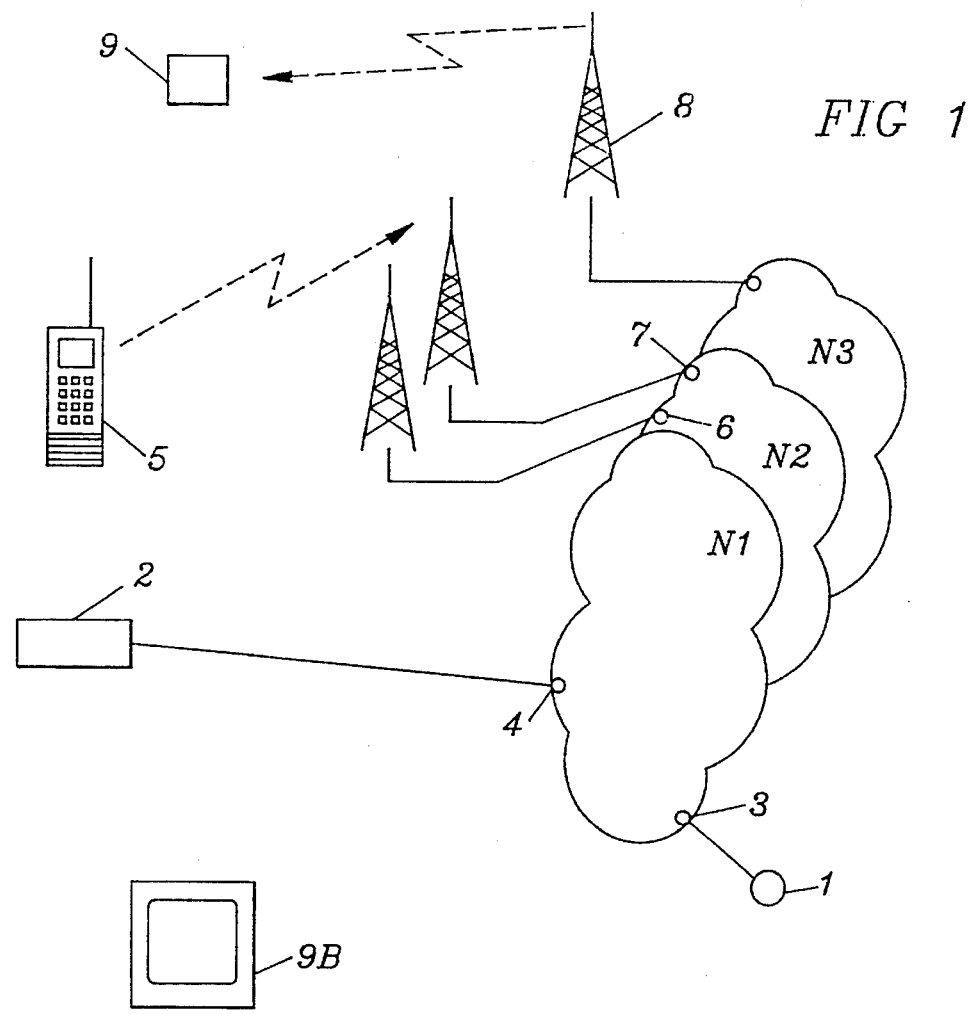
FIG. 1 is an overall view of a communication environment which includes different telecommunication networks that have different properties and which can be used for communication with the aid of the inventive communication method.

FIG. 1 is an overall view of one example of a telecommunication environment in which the inventive communication method is used. References N1–N3 identify different telecommunication networks. Each network permits communication between terminals that are connected to respective networks. Each network has a limited range. The network N1 is a traditionally stationary network which permits two-way communication between fixed ports, to which the schematically illustrated terminals 1, 2 are connected. Terminal 1 is connected to the network at the fixed port 3 and terminal 2 is connected to the network at the fixed port 4. One or more terminals may be associated with the port 4, depending on the nature of the port, e.g., whether it is an access port or a terminal port. When a user at terminal 1 wishes to contact a user at terminal 2, the user initiates a call at terminal 1 and quotes the destination-identity as the address of the called party; this identity is abbreviated to destination-ID which is transmitted by the network to the hardware address of port 4. The call is directed through the network N1 to the port 4, in which, when several terminals are connected to this port, for instance, when the port is a PABX-input, equipment is found for number analysis of the aforesaid destination-ID. The number analysis then discloses the terminal to which the call shall be directed.

The term destination-identity will be explained in more detail below, although it can be said briefly here that the term is service-orientated. The destination-ID indicates the service (not the terminal) in the network (not where the destination, or addressee, is found in the network). The ports 3 and 4 are also called access ports, since they provide the user access to the network. The network N1 permits two-way traffic between fixed ports. Examples of the network N1, in addition to the conventional telephone network, include telex networks, ISDN-networks. The terminals 1, 2 may be standard telephone apparatus, telex apparatus, PABX-units.

The network N2 is an example of a mobile network which permits two-way communication between two terminals, of which at least one is a mobile terminal 5. A mobile telephone apparatus is one example of a mobile telephone. The mobile terminal can be reached via ports 6, 7 which communicate cordless with mobile terminals over schematically illustrated base station units. In order for communication with the mobile terminal to take place, it is necessary for the network to localize the mobile terminal and also to choose which of the ports 6, 7 shall be used for communication with the mobile terminal. The mobile terminal 5 has a terminal address, so-called terminal identity, abbreviated to T-ID, which is used when communication with the mobile terminal is desired.

The network N3 is an example of a network which will permit only one-way communication from a central 8 to a mobile terminal 9 whose position in the network is not known to the network N3. A person paging network in which the mobile terminals are called from the central 8 by global transmission is one example of such a network. An individual mobile terminal is called while using a terminal-ID. In a paging network, the mobile terminal 9 is able to receive a paging message transmitted by the central, irrespective of where the mobile terminal is located within the area covered by the network. A mobile terminal, however, cannot communicate back to the central 8.

It is in an environment similar to that illustrated in FIG. 1 in which the present invention is applied. It is also in such an environment that a user is found. The user is able to communicate in each individual network, but the networks are poorly coordinated with one another because inter-network-communication is only possible when the user himself controls cooperation between independent services in the different networks.

According to the invention, it is possible for a user, hereinafter referred to as customer U, to obtain access to different networks, similar to N1–N3 above, via different types of terminals and in this way obtain access to those services offered by respective networks. The aforesaid object is achieved by providing the customer with an intermediary, also called electronic secretary, ES. The intermediary has intelligence and is realized in the form of a computer equipped with software and hardware for communication in the telecommunication networks N1–N3. The intermediary ES can be reached by the customer U through different terminals in each of the networks N1–N3.

Figure 2:
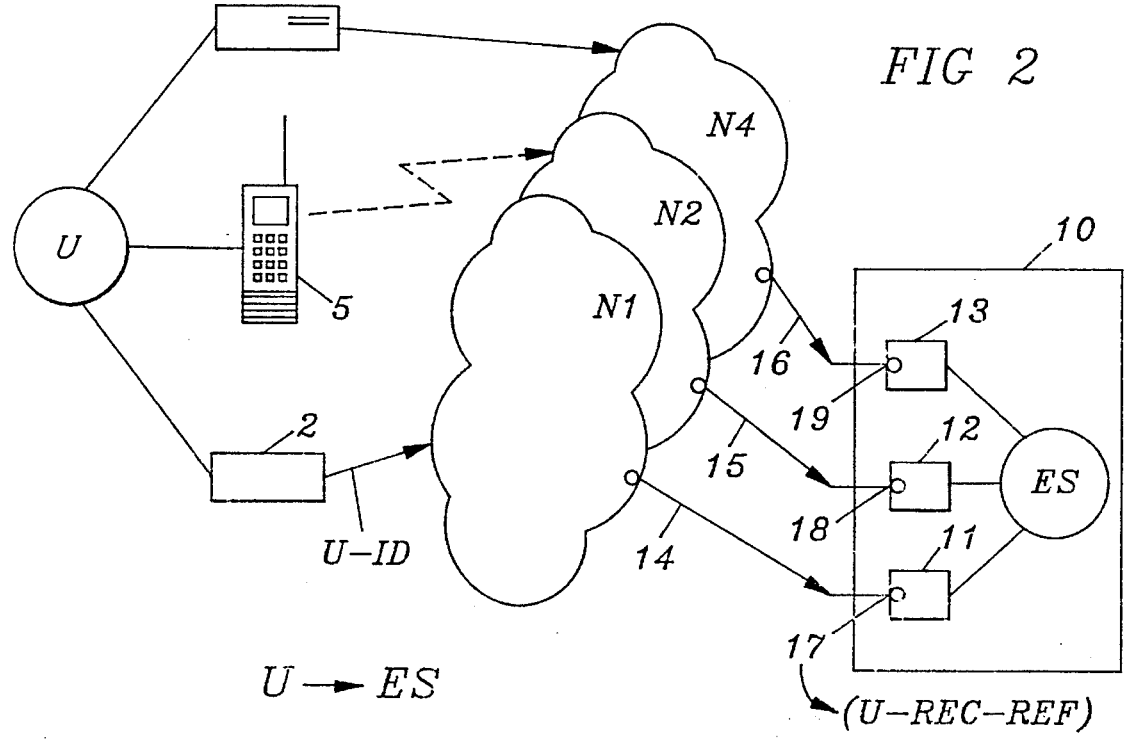
FIG. 2 is an overall view of a first embodiment of the invention, in which a service mode that comprises an intermediary is called by a customer served by the intermediary.

FIG. 2 is an overall view of a first embodiment of the invention. In this case, N4 identifies a packet-coupled network, for instance an electronic-mail-network. The intermediary ES is found in a service node 10 which includes a number of terminals 11, 12, 13, each of which is connected to a respective network N1, N2 or N4 through trunk lines 14, 15, 16. The terminal 11 has access to the network N1 via a port 17. The terminal 12 has access to the network N2 via a port 18, and the terminal 13 has access to the network N4 via a port 19.

The customer U has access to the network N1 via the terminal 2, to the network N2 via the terminal 5 and to the network N4 via a terminal 9B.

A foreign user who wishes to communicate with the customer is never able to contact the customer directly, but must first turn to the intermediary. The intermediary deals with all incoming messages and handles the call of the foreign user in accordance with instructions earlier given to the intermediary by the customer.

When the customer wishes to contact a foreign user, the customer communicates with its intermediary and instructs the intermediary to make the desired call. If the customer wishes to bypass his intermediary, the customer makes a direct call to the foreign user while using the user's destination-ID.

It will be apparent from this that the intermediary may receive a call from a foreign user on the one hand and from the customer on the other. In order to enable the intermediary to distinguish between calls of these two categories, the customer has two different destination-identities in each of the networks N1–N3, i.e., the customer-identity, U-ID, and a destination-identity D-ID, as described in more detail below. The destination-identity D-ID is the address found in the public directory, e.g., the telephone directory, over registered users in respective networks. This "public" address, however, does not lead directly to the customer, but is steered permanently to the customer intermediary ES. The customer identity U-ID is secret to everyone except the customer himself and is used by the customer when communicating from U to ES. The "secret" address U-ID is not publicized.

The customer instructs its intermediary to receive, also called terminate, incoming calls from foreign users and to provide these users with a predetermined service, such as, for instance, to ask from where, or from whom, the call is made and what the user wants. The customer also instructs its intermediary as to how each incoming call shall be dealt with on behalf of the customer. For instance, the customer may desire all calls to be passed through immediately to the customer. Another time, the customer may desire that an incoming call is first given the aforesaid service, whereafter the intermediary, after each incoming call, contacts the customer to enquire whether or not the customer desires (a) communication with the calling party now, at once, so-called interactive communication, or (b) not until later. For example, the customer can reject interactive communication and instead instruct the intermediary to take a message from the calling foreign user or, conversely, to deliver a message to the foreign user. Such communication via delivered messages is called indirect communication. The customer has many possibilities of choosing how an incoming call shall be dealt with. For instance, the customer can completely reject the desired communication or may choose to communicate only with specified foreign users, in which case the intermediary functions as a filter. This procedure is described fully in copending U.S. patent application No. 08/018,233.

During the interaction between a foreign user F and ES, the intermediary ES has software and hardware equipment for, e.g., voice controlled enquiry, recording equipment for playing-back an recording messages. When receiving a call from the foreign user F, the intermediary ES may, for instance, enquire whether the foreign user wishes to leave a message. Alternatively, or complementary to this, the intermediary may inform the foreign user as to where, i.e., in which network, and when, i.e., at which time, the customer U can be contacted. The level of service capable of being delivered by the intermediary is determined beforehand by "agreement" between the customer U and the intermediary ES.

It will be evident from the aforegoing that the customer has at least three different reasons for contacting his intermediary, namely
(i) to give the intermediary instructions;
(ii) to listen to recorded messages left by foreign users; and
(iii) to himself order through the intermediary communication with a specified foreign user.

When the customer wishes to call his intermediary, he begins by choosing either terminal 2, 5 or 9 (FIG. 2) whereafter he calls the intermediary ES while using the secret address U-ID as the address. U-ID is translated and points to a valid port address in the network used for the call. The network used will then create a connection from the terminal concerned, 2, 5 or 9, to the service node 10 in which the intermediary ES is connected to the network concerned. The call arrives on one of the terminals 11, 12 or 13 and the address or destination indicated in the call, i.e., U-ID, points to the terminal concerned, in this case to ES. Alternatively, U-ID may have the form of a common group-ID supplemented with a procedure for identifying separate U-individuals. The intermediary ES terminates the call and software in ES now commences a customer process which treats the call as a transaction. The customer process establishes the port on which the call arrived at the terminal concerned and creates a relationship between the call and the port on which the call arrived. This relationship is called the customer reception reference, abbreviated to U-REC-REF, and, simply said, can "Christen" the call concerned. The "Christian" name U-REC-REF is used by different customer processes when these processes wish to refer to the call concerned. The relationship has the form of a data record which remains in force until the customer and the intermediary are both agreed that the data record shall be annulled. Examples of such customer processes are described in copending U.S. patent applications Nos. 08/018,197 and 08/018,268. Such customer processes are used primarily when establishing connections between two parties A and B.

Figure 3:
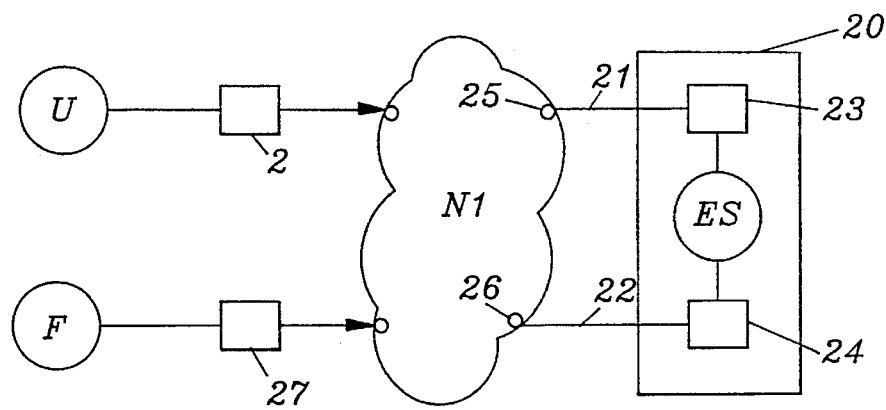
FIG. 3 is an enlarged view of the embodiment illustrated in FIG. 1 when applied for only one telecommunication network, the Figure showing an individual service node comprising an intermediary which is called by its customer and also by a foreign user.

FIG. 3 is an enlarged view of the FIG. 1 embodiment, although only for one network, in this case N1. The intermediary ES is found in an individual service node 20 which has not one incoming line (as with the FIG. 1 illustration) but two incoming lines 21 and 22, to each of which there is connected a respective terminal unit 23 and 24. When the network N1 is the standard telecommunication network PSTN, the terminal units 23, 24 may, for instance, be corresponded together by one single telephone which has two incoming lines. If the network N1 is an ISDN-network, the two lines 21, 22 are two logic lines which are realized in the form of one single physical line. The intermediary ES operates towards each of the two terminal units 23, 24. The incoming line 21 is connected to a fixed port 25 and the incoming line 22 to another fixed port 26 in the network N1. Calls arriving at the intermediary ES and which use U-ID as the terminal address are treated as calls from the customer, whereas calls which use the public directory number D-ID as their destination address are treated as calls from a foreign user. In FIG. 3, the foreign user is designated F. The foreign user has access to the network N1 via a terminal 27.

Figure 4:
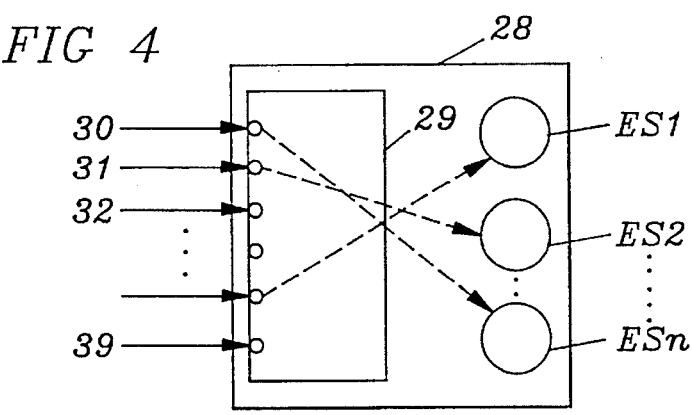
FIG. 4 is an enlarged view of a shared service node having common resources which are shared by several customers to produce several intermediaries.

As described above, the intermediary ES is a computer equipped with software and hardware for communication with terminals. However, the traffic strength of an individual customer is often not sufficient to fully load the computer. In other words, the computer may have residual capacity for handling several customers. FIG. 4 illustrates an example of a shared service node 28 which has resources, e.g., in the form of computers with programs and hardware for communication between different terminals, which are common to several intermediaries, designated here ES1, ES2 . . . -ESN. The intermediary ES1 is intended for customer U1, intermediary ES2 is intended to handle communication with another customer U2, and so on. Furthermore, the shared service node 28 includes a private exchange, e.g. a PABX-type exchange, having a number of incoming lines 30–39 for receiving calls from foreign users F and from the customers U1, U2, . . . UN. It is evident that an incoming call may arrive on any one of the lines 30–39 whatsoever. A number analysis is then performed in the exchange 29, therewith to establish to which of the customers U1, U2, . . . UN the call is directed. The call is then coupled to the intermediary ES of the corresponding customer, which terminates the call and creates the aforesaid relationship U-REC-REF between the call and corresponding ports.

Figure 5:
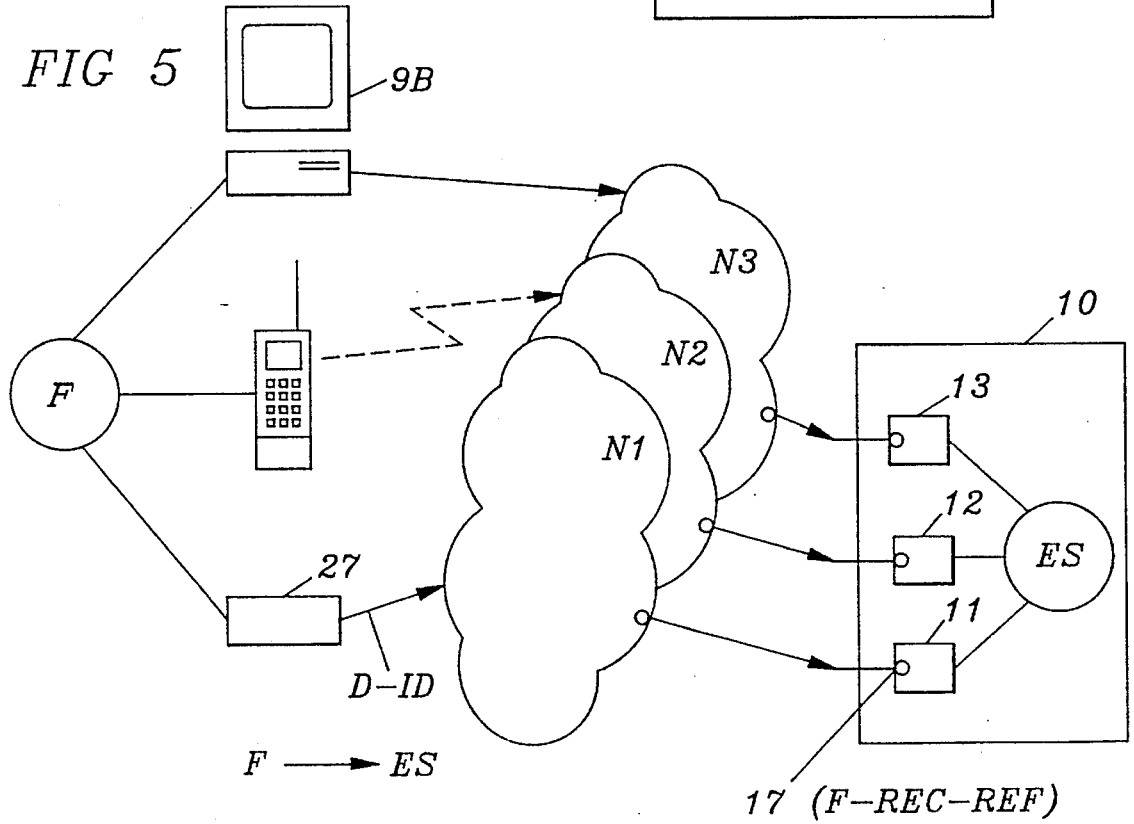
FIG. 5 is an overall view similar to FIG. 2, wherein the intermediary is called by a foreign user.

FIG. 5 is an overall view similar to FIG. 2, wherein the intermediary is called by a foreign user F who has access to the network N1 via a terminal 27. It is possible that the foreign user has access to several networks, for instance the mobile telephone network. The call procedure is similar to that described with reference to FIG. 2, although with the difference that in this case the foreign user F uses the public directory number D-ID as the destination address. Similar to the manner carried out when a call is received from the customer, an assignment process is initiated which creates a transaction to which a reference, F-REC-REF, is allotted, this reference referring the call incoming from F to the port on which the call arrives. This relationship is used by different assignment processes in different terminals, when these terminals wish to refer to the relevant call from F.

Figure 6:
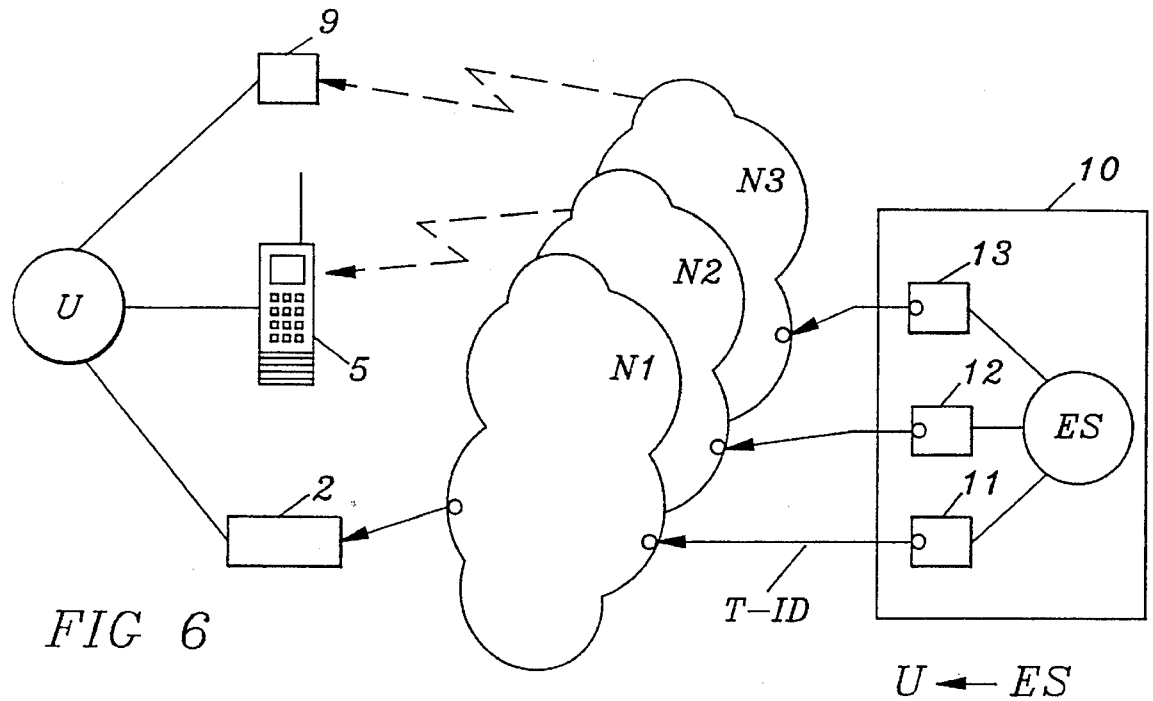
FIG. 6 is an overall view similar to FIG. 2, wherein the intermediary is called by its customer in several telecommunication networks.

FIG. 6 is an overall view similar to FIG. 2, wherein the intermediary ES makes a call to its customer U who may be located in any one of the networks N1–N3. The intermediary ES is unaware of the network in which network the customer is located. The call to the customer takes place in the form of a one-way transmission of an alert-signal, the sole intention of which is to alert the customer U. No connection is created between the intermediary and U in this phase of the communication process. Paging can be effected in different ways and along different routes, for instance by global transmission in the network N3, directed cordless transmission in the mobile network N2 or to a fixed terminal in the network N1. When an alert-signal is sent in the person-paging network N3, the intermediary uses as a destination address the customer's terminal-identity, T-ID, i.e., the address of the individual terminal 9. When an alert is signalled in the mobile network, a cordless one-way alert-signal may be sent to the terminal 5 which when receiving the alert-signal, e.g. solely, generates an acoustic signal and in this way draw the customer's attention to the fact that he should contact his intermediary. In the case of alert-signalling in the fixed network N1 and when this network N1 is the standard telephone network PSTN, an alert can be signalled at regular intervals, wherein the addressed telephone, upon receipt of each alert-signal, produces a short buzzing sound which draws to the attention of the customer that he should contact his intermediary. The intermediary ES is able to perform this alert-signalling process in all of the networks involved N1–N3, either in parallel or in sequence. The intermediary ES is able to page its customer, or employer, in accordance with intelligent processes, e.g., by beginning to page in the network in which the customer was last situated (although not in the person-paging network N3). If paging is to be carried out in the daytime, the intermediary ES may, for instance, begin to page at the customer's workplace, when paging the customer in the evening, the intermediary may begin to page the customer at his home. For example, if paging is to be carried out between the hours 07.00–08.00 and 17.00–18.00, paging can be commenced in the mobile network N2, since it is probable that the customer will be on his way to work or on his way home during these periods. It should be noted that when carrying out a paging process, terminal identities are used which refer to the number of the individual terminal instead of to the service. For example, if U is located at a terminal which is not the customer's own terminal, it is necessary for the customer U to inform his own intermediary ES of the terminal-ID concerned, in order that ES is able to page U.

The term destination-identity (U-ID and D-ID respectively) refers to the service of being brought into contact with a user served by an intermediary ES. The destination-identity is service-orientated and relates to the service in the network and not the whereabouts of the service in the network. A destination-ID results in the caller being brought into contact with a customer intermediary ES. U-ID is used by the customer U to be brought into contact with his intermediary ES. D-ID is used by foreign users F when they wish to be brought into contact with the customer U.

T-ID relates to a one-way alert and the alert is sent to one specific apparatus.

U-REC-ID relates to the port in the network on which a customer contacts his ES to U's call, and is used by ES as a reference to this call.

The reference F-REC-ID is used for the same purpose as U-REC-ID, but relates to a foreign user.

For example, U-REC-REF can be used by ES to connect its customer with a foreign user when the customer is mobile in a network. Thus, the mobile network N2 need not keep a check on the whereabouts of the consumer in the network. U-REC-REF functions as a fixed point for the mobile customer.

Figure 7:
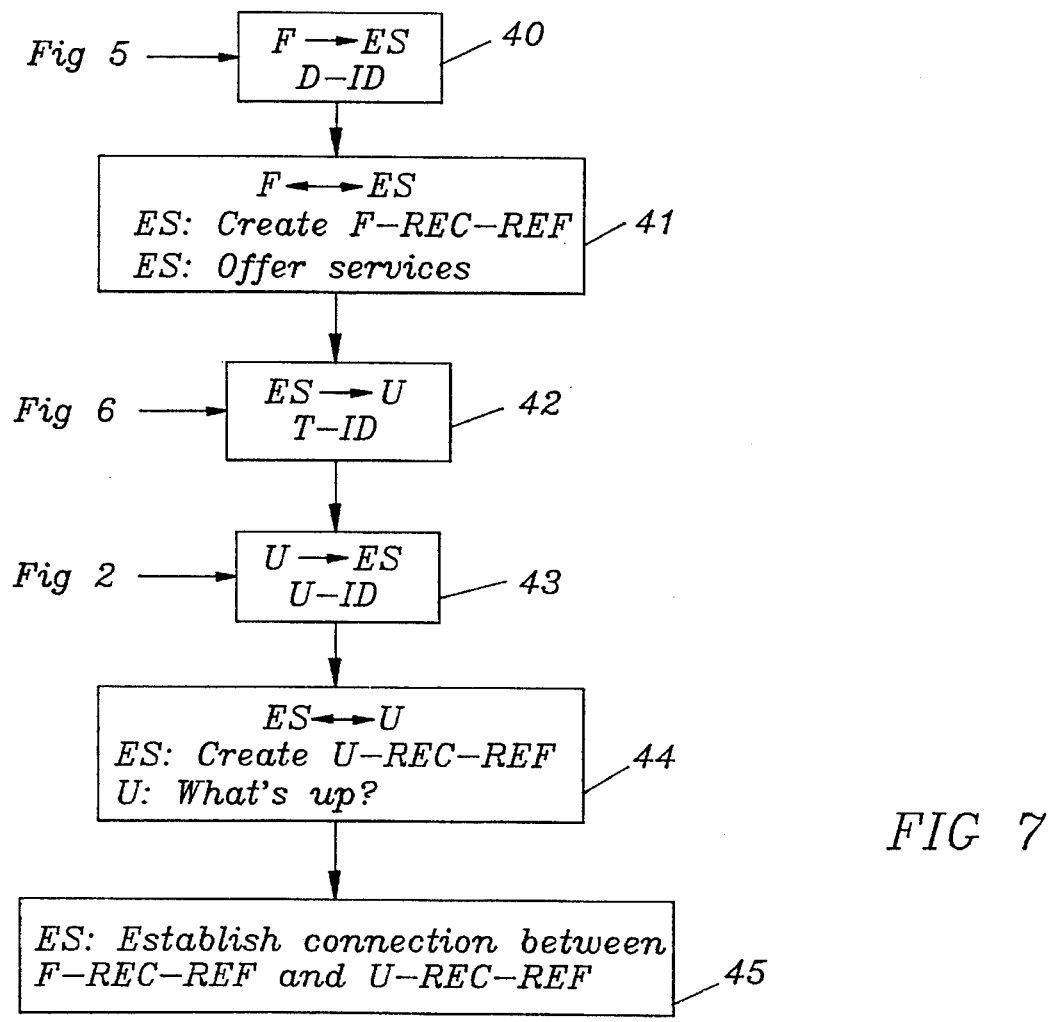
FIG. 7 is a flow sheet which illustrates the inventive communication method when a foreign user seeks contact with a customer.

Subsequent to having defined the various identities and references used in the described call processes, it is now possible to describe the communication method applied when foreign users F seek contact with the customer U. The communication method is illustrated with reference to the flow sheet in FIG. 7, which commences with a call from a foreign user F to the intermediary ES using the address identity D-ID. This stage is illustrated in block 40 and corresponds to the call described in FIG. 5. The intermediary ES parks the call and commences the aforesaid transaction thus creating a relationship F-REC-ID between the call concerned and the port on which the call arrived. Communication between F and ES is now commenced, wherein ES asks who F is, what F wants, etc. Briefly, ES offers the foreign user F its services in accordance with the instructions given by the customer. This stage in the communication process represents the interaction between ES and F and is shown in block 41 of FIG. 7. The intermediary ES then begins to page its customer, using the customer's T-ID. Paging is carried out in the manner described with reference to FIG. 6. Upon completion of this paging process, ES adopts a waiting state and awaits a call from its customer. When the customer receives the alert-signal, he may find himself in any one of the networks N1–N3 whatsoever and then calls his intermediary ES while using his customer identity U-ID in the network concerned as the destination address. This stage of the method corresponds to the call process illustrated in FIG. 2 and is represented in FIG. 7 by block 43. When ES receives the call from U, a transaction is created which discloses the relationship between the call from U and the port on which U has arrived. This relationship is the aforesaid U-REC-REF. The intermediary now functions as the customer. The customer asks ES why the alert was given, the customer is able to give ES instructions and can leave a message. This interaction between U and ES is shown in block 44, which corresponds to those processes described above with reference to FIG. 2. As a last stage in the communication process, ES then initiates a meeting between F and U, applying the method described in copending U.S. patent application No. 08/018,223.

If the customer wishes to contact F immediately, the intermediary ES connects the port disclosed in U-REC-REF with the port disclosed in F-REC-REF, whereupon interaction immediately takes place between the parties. This latter stage in the communication process is shown in block 45 in FIG. 7. During the interaction between F and ES according to block 41, F declares his errand, states who he is, etc. It may happen that F is told that U cannot be reached. In this case, the intermediary ES may have been instructed by U to ask F to leave a message, this message then being stored by ES and later delivered to U. This method is provided with a label or marking which relates the message to F-REC-REF. The message may also be provided with a time stamp, in accordance with conventional techniques. Subsequent to having stored the message, the intermediary may ask F to call at a later time and ask if there is a message from U to F. Interaction between ES and F is then terminated. When F later calls ES, ES looks to see whether or not customer U has left a reply to F's message and, if such is the case, delivers this message to F. In this way, indirect communication can take place between F and U and the data record to which F-REC-REF is related is not annulled until both parties F and U are agreed that their mutual communication in this particular case is ended.

Figure 8:
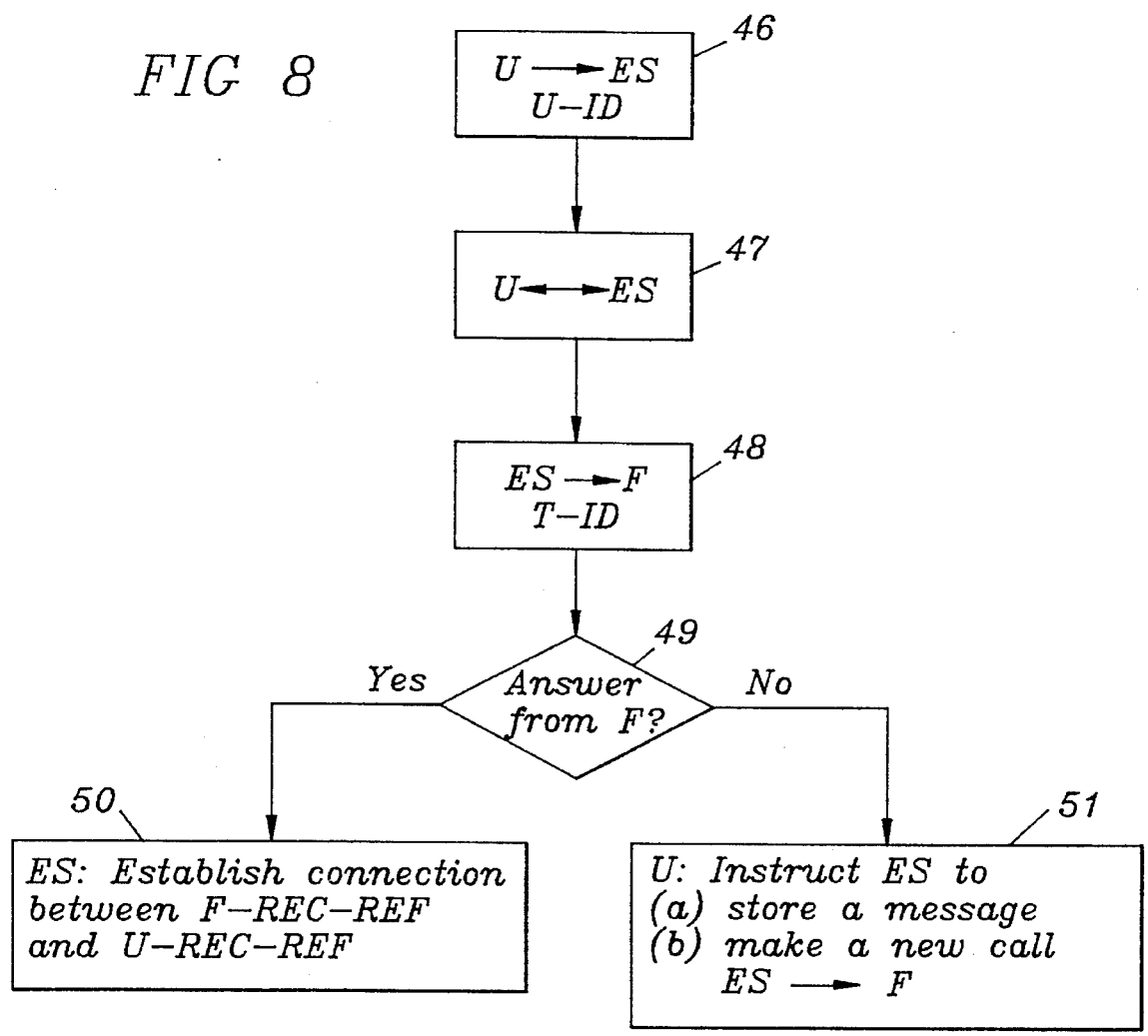
FIG. 8 is a flow sheet which illustrates the inventive communication method when a customer calls a foreign user.

FIG. 8 illustrates the other case, namely the case in which the customer U wishes to contact a foreign user F. In the first stage of this process, block 46, the customer calls his intermediary ES while giving the customer identity U-ID. This process stage is corresponded by the above description with reference to FIG. 2. The intermediary ES terminates the call from its customer U, and commences an assignment process which creates a transaction in which the call is related to the port on which the call arrived. The reference used is the earlier mentioned reference U-REC-REF. The intermediary ES is now aware of the network in which the customer is at present located. The intermediary asks what the customer desires and an interaction takes place between U and ES, as shown in block 47. The intermediary ES then calls F while using F's T-ID, block 48. Two different circumstances can now occur, selection block 49, namely that F either answers or fails to answer. If F answers, the intermediary ES initiates a connection between U and F, block 50, by sending a connection order to a meeting arranger, which thereafter establishes the desired connection. The manner in which this connection is established is described in more detail in copending U.S. patent application No. 08/018,223. If F fails to answer, the intermediary informs its customer to this effect and the customer is now able to instruct its intermediary, for instance to instruct ES to make a further call and to leave a message to the effect that communication is desired, block 51.

During this interaction between U and ES, the customer U may instruct his intermediary ES that U wishes to receive communication from foreign user F over a given network chosen from among the networks N1, N2 and N3. the network on which the customer chooses to receive the communication need not necessarily be the network in which the foreign user F calls. To this end, the intermediary ES has, at its disposal, conversion equipment which makes it possible to continue the communication with the foreign user F while using the network which the foreign user desires to use and continue communication with the customer while using the network that the customer desires to use. An example of such conversion equipment is described in copending U.S. patent application No. 08/018,214, in conjunction with a gate-way.

Because communication between the foreign user F and the customer U is split-up into two communications, one between the foreign user F and the intermediary ES and the other between the customer U and the intermediary ES, both ends of the coupling route from F to U are released and can be handled separately, which creates the aforesaid possibility of allowing the customer to decide dynamically how each incoming call shall be dealt with on his behalf, and the various alternatives available to the customer are considerably more than the alternatives available in the traditional case in which an incoming call can only be accepted or rejected. The customer U informs the intermediary how the customer wishes to be treated with regard to the incoming call, whereafter it is the intermediary and not the customer which proceeds with what should be done. Because the two ends of the connection between the foreign user F and the customer U are released from one another, there is no need for either of the parties F and U to be aware of the location of the other party, i.e., in which network the other party is situated.

If the customer U desires redirection, e.g., of the telephony service, this is passed by the customer U to the intermediary ES, which ensures that incoming calls are directed to the new terminal identity T-ID where the customer U is at that moment located. Similarly, the intermediary ES maintains a continuous list of all the redirections desired by the customer and the customer need only inform the intermediary of the telecommunication network or networks over which communication with the foreign user shall take place. When redirection shall cease to apply, the customer informs the intermediary ES to this effect and the intermediary will then take those measures necessary to direct incoming traffic to the desired terminal 2, 5 or 9.

The intermediary ES is fixed in each of the networks N1–N3. These networks need not keep a check on whether or not the customer U has arranged for temporary redirection, since all such redirections are handled by the intermediary ES. Irrespective of how the foreign user F moves, the foreign users communicate with the intermediary ES and the intermediary is stationary. This is opposite to the case of, e.g., mobile telephony, in which the stationary address or destination is a mobile terminal. In actual fact, not even the intermediary ES need know of the network in which the customer U is found, since it is sufficient for the customer to contact his intermediary ES when convenient to the customer in order to hear whether any incoming calls have been recorded and from where these calls originated. The intermediary has contact with U in this way. In this connection, the customer can order the intermediary to initiate the connections that the customer wishes to establish.

By introducing the intermediary ES, it is possible for foreign users F either to reach the customer directly or to obtain information concerning (a) where the customer can be reached or (b) when the customer intends to take the initiative in contacting the foreign user F. The intermediary ES serves foreign users throughout a full calendar day and the customer always has control over how each individual call shall be dealt with. For the foreign user, the communication method via the intermediary means that the customer U can be reached via any terminal whatsoever in which network whatsoever, provided solely that the foreign user has the aforesaid public directory information regarding the user's D-ID. Foreign users need not be aware of the network in which the customer U is found. This is the feature that gives the present invention its multi-network properties. By multi-network properties is meant that U is the user of several networks and can obtain access via many alternative terminals. Each party can appear in any terminal whatsoever and in which network whatsoever. As before mentioned, each party is free to move not only within one network but also between networks.

Figure 9:
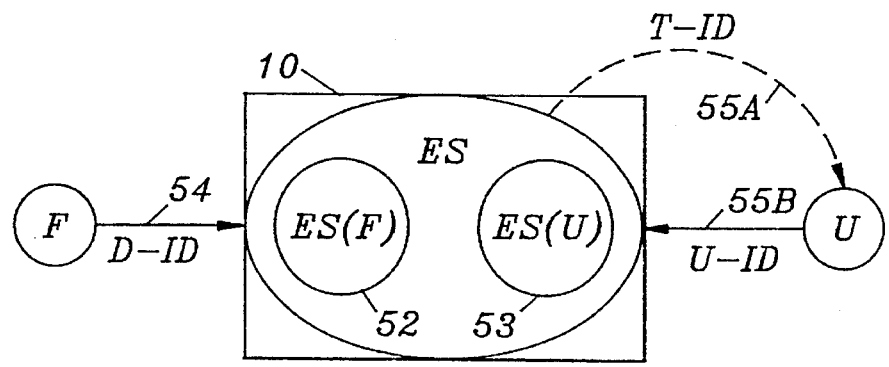
FIG. 9 illustrates division of the inventive intermediary into two parts, one for communication with a foreign user and another for communication with the customer.

FIG. 9 illustrates a functional division of the intermediary ES into a first part 52, also referenced ES(F) in the Figure, which communicates with foreign users F and a second part 53, also referenced ES(U) in the Figure, which communicates with the customer U. When so instructed by the customer, the first part 52 can, itself, make calls to specified foreign users, receive calls and store messages from foreign users F, play-back messages and ask questions through voice-controlled speech enquiry, store answers, etc. The messages may also be stored selectively, i.e., only messages from specified users are stored. The Figure also illustrates the manner in which the foreign user F establishes a connection, with the first part 52, symbolically shown with the full-line arrow 54, by stating the D-ID of the customer, and the manner in which the second part 53 of the intermediary thereafter alerts the customer, symbolically shown by the broken arrow 55A, by calling with the terminal identity T-ID of the customer, and also shows the manner in which the customer then establishes a connection with the destination address U-ID by calling ES(U), shown symbolically by the full-line arrow 55B.

Figure 10:
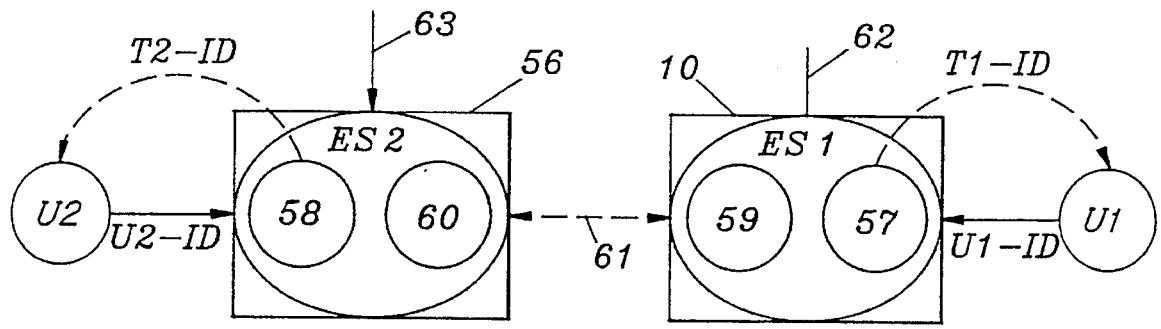
FIG. 10 illustrates two customers, each provided with a respective intermediary.

FIG. 10 is an overall view which illustrates an example of two users U1 and U2, each of which has a respective intermediary ES1 and ES2. ES1 is found in the service node 10 and ES2 is found in another service node 56. The service node 56 may be identical to the service node 10, although for the sake of illustration these nodes are shown to be separate. Similar to the FIG. 9 illustration, each intermediary ES1 and ES2 has two parts, i.e., a first part 57 and 58, each of which communicates with its customer, and a second parts 59 and 60, which communicate with foreign users. Each of the customers U1, U2 gives his instructions to his respective intermediaries ES1 and E2, whereafter the second parts 59, 60 of said intermediaries communicate with one another over a signal path shown symbolically by the two-way arrow 61. The interaction between U1 and ES1 and the interaction between U2 and ES2 takes place in the same manner as that described with reference to FIG. 2 and with the use of the addresses shown in FIG. 10, wherein the addressee or destination identity of U1 is designated U1-ID and the destination or addressee identity of U2 is designated U2-ID. U1 has the terminal identity T1-ID and U2 has the terminal identity T2-ID. The destination-identity of U1 is D1-ID while the destination identity of U2 is D2-ID.

Different circumstances can occur, depending on whether or not the intermediaries ES1 and ES2 are aware of each other's existence. Assume that U1 wishes to communicate with U2. U1 calls its ES1 with its customer-ID, designated U1-ID, and instructs ES1 to seek contact with U2, who is then considered as the addressee and is called by ES1 with reference D2-ID.

If ES1 knows of the existence of ES2 or if ES1 is able to establish through the destination-identity D2-ID that U2 has an intermediary service, i.e., that an intermediary serves U2, then ES1 need not establish a connection to ES2 but is able to signal to ES2 through the signal connection 61.

If ES1 is not aware that U2 has an intermediary service, ES1 can establish a connection to U2 while using U2's destination identity D2-ID. The second part 60 of ES2 terminates the connection and can inform ES1 to the effect that the connection to an intermediary has been terminated. For instance, this can take place in the same way as that performed with a conventional modem, where a handshaking procedure is introduced. When the intermediary ES1 has informed that the connection has been terminated in an intermediary, ES1 can switch to communicating with ES2 over the signal route 61. Alternatively, ES1 can signal to ES2 on the established connection and switch-in a modem and transmit its orders or instructions to ES1 in the same manner as that when two modems speak to one another. At the same time, ES1 notes in the transaction created in the signalling process that when ES1 called U2 with D2-ID, an intermediary answered. This intermediary has a signal address and this signal address is noted by ES1 in the transaction. The next time ES1 calls U2, it is unnecessary for ES1 to begin to establish a connection to ES2 but can instead use the signal address of ES2.

There are many different ways in which the intermediaries can communicate with one another. The invention proposes a fundamental principle which can be implemented in many different ways. The invention is based on the concept that the communication U1-U2 can be treated as a communication between ES1 and U1, a communication between ES2 and U2 and a communication between ES1 and ES2. ES1 and ES2 check the position of their principals U1 and U2 respectively with regard to the communication U1-U2, i.e. as to whether communication shall be accepted now or later, whether or not the communication shall be entirely rejected or whether or not the communication shall take place indirectly, via the intermediaries. How these latter alternatives are carried out and the equipment required herefor is described in a copending U.S. patent application No. 08/018, 223.

As an alternative to the above-described method of establishing a connection between U1 and U2, ES1, upon receiving the request for communication with the customer U2 from its customer, can send a meeting order, represented by the arrow 62, to a meeting broker of the kind described in U.S. patent application No. 08/018,223. The meeting broker is not shown in FIG. 10. The meeting broker then contacts U2, represented by the arrow 63, with the request for a meeting between U1 and U2. When ES2 receives this request for a connection with its customer, ES2 sends an alert, represented by the broken arrow T2-ID in FIG. 1, to its customer U2, in the aforedescribed manner, whereafter U2 contacts ES2 and learns of the desired communication with U1. U2 informs ES2 of its position. ES2 then informs the meeting broker of U2's position in this regard. This procedure 62→ES2→alert U2 continues until the broker (not shown) finds that the position of both parties U1 and U2 is favourable to the desired communication, wherein the broker connects the parties, one to the other. Alternatively, the broker may send a meeting request to a meeting arranger MA in the manner described in the aforesaid U.S. patent application No. 08/018,223. The customer U2 is thus also in this case able to take a position continuously with regard to all incoming calls and to decide individually whether or not communication shall take place now or at a later time or be totally rejected or shall take place indirectly with the aid of messages. One example of a message is: "I am engaged in a meeting just now, but if U1 would like to call me in 30 minutes, I will be prepared to accept the establishment of a connection". In this way, the use of intermediaries increases the probability of two parties being able to meet.

Each intermediary may further simplify its Principal's communication, by assigning to all of the different address-identities of an individual foreign user in the various networks at the foreign user's disposal a short-address-ID which is common to all networks. The intermediary catalogues all of these short-address-identities. When the customer wishes to contact a specified foreign user, he merely states the short-address-identity which, for instance, may have the form of a digit combination or, still more simply, the name of the foreign user, and the intermediary then translates the short-address-identity to the various destination-identities D-ID over which the specified foreign user disposes in the different networks.

Figure 11:
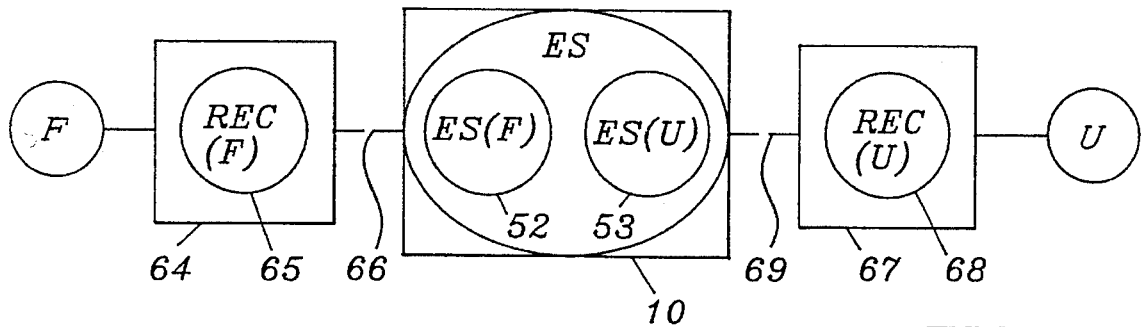
FIG. 11 illustrates how the first part of the intermediary is distributed in a network.

By way of introduction to the second embodiment of the invention illustrated in FIG. 11 can be mentioned the situation that occurs when the customer changes his permanent place of residence, for instance moves to another part of the country or moves to another country. It is then appropriate for the customer to take with him his intermediary, so that foreign users in the new place of domicile are able to communicate with U via his intermediary ES. Foreign users in the previous place of domicile are able to communicate with U via a receptionist REC(F) located in the earlier place of domicile. The purpose of the receptionist is to receive old foreign users F and offer them a certain degree of service. It is also the duty of the receptionist to inform the intermediary ES, which is now located at the new place of domicile, which "old" foreign user F desires to come into contact with the customer, and the intermediary ES passes this information on to the customer, in turn. The receptionist REC(F) may also store incoming and outgoing messages and playback the messages recorded. According to the invention, this receptionist-functionality is achieved by the first part ES(F) 52, which deals with contact of the intermediary with foreign users, distributing in geographically separate nodes of a network. It is also possible to distribute this part in a plurality of networks and at different sites in each individual network. It is also possible to distribute the part 53 of the intermediary, this part being designated ES(U) and handles the customer in geographically distributed nodes, and to distribute this part in different networks. This enables the customer to come into contact with his intermediary, via a receptionist REC(U).

The second embodiment, which includes distributed functions for dealing with foreign users F and with customers U, is illustrated in FIG. 11. Located in a service node 64, which is geographically separated from the service 10, is a receptionist 65, designated REC(F), which is in connection with the intermediary ES via a signal connection 66. Another service node 67, which is separate from the service node 10, includes a receptionist 68, designated REC(U), which is connected to the intermediary ES via a signal connection 69. The receptionist 65 has a functionality which corresponds to the functionality of the first intermediary part ES(F) referenced 52. The receptionist 68 has a functionality which corresponds to a part of the second intermediary part 53, namely the part which terminates customer connections. The receptionists 65 and 68 are implemented in the form of computers with associated software and hardware for communication with foreign users and with intermediaries respectively. The receptionist 68 is located somewhere in some network as close as possible to U where the receptionist function can be carried out. The receptionist 65 is located as close as possible to foreign users where the receptionist function can be carried out. For example, the node 10 may be located in one country, the node 64 in another country and the node 67 in a third country. The functions of the first and the second intermediary part 52, 53 can be contracted, or shortened, since ES is aided by the receptionist's 65, 68 localized from ES.

Receptionists carry out the aforesaid functions and are preferably not dedicated to one individual customer U, but are able to carry out general services for a large number of customers U1, U2, U3 . . . , etc. One example of the services capable of being carried out by a receptionist is that of asking questions, such as "Who are you?", "What do you want?". Receptionists are able to receive instructions from their respective customers and to store messages from foreign users, present messages from foreign users in the same manner as the intermediaries according to FIG. 9 behave to foreign users. However, the intermediaries ES still serve one single customer and determine those operations that are to be carried out with regard to foreign users. The services of storing messages, taking answers to questions, etc., are "purchased", however, by the intermediary ES from the receptionist 65, which passes the results back to ES.

The customer may wish to communicate with the receptionist 68 because he is mobile in a network and because it is more suitable for U to contact the receptionist 68, because the receptionist geographically is closer to U than the intermediary ES. Naturally, the receptionist 68 is unable to tell whether the call arriving from U arrives from a foreign user or from U. The customer U is then able to identify himself and the receptionist 68 will contact U's intermediary ES over the signal connection 69, thereby enabling communication to be established between U and ES. Alternatively, the customer U may deliver to the receptionist 68 a message which is then sent by the receptionist to the intermediary ES.

Figure 12:
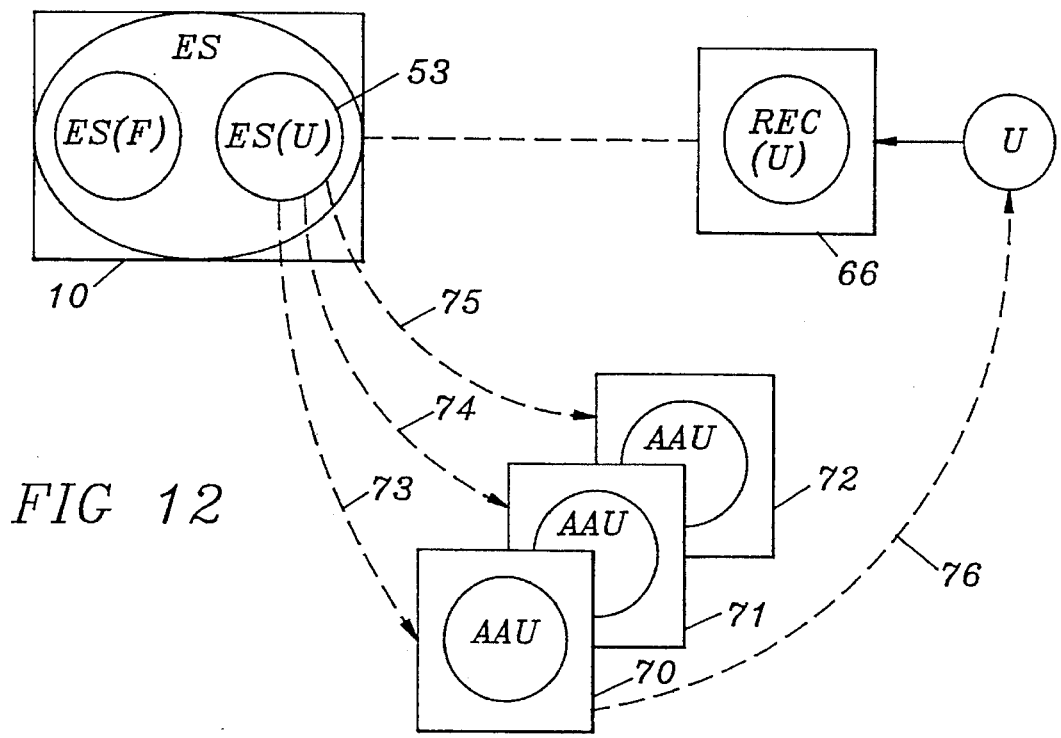
FIG. 12 illustrates how the second part of the intermediary is distributed among a number of networks.

In the way as the first intermediary part ES(F) 52 may be distributed throughout several networks and to several nodes, a part of the second intermediary part ES(U) reference 53, namely that part which relates to one-way communication with the customer, inter alia personal paging, may be distributed in several geographically separated nodes and in several different networks. This is illustrated in FIG. 12. In this case, the distributed part of the second intermediary part 53 is not called a receptionist but an alert agent AA or dispatch agent since the sole purpose of the distributed part is to page the customer, i.e., to serve as an agent which is utilized by the intermediary ES to send a message, namely an alert message, to its customer U. The FIG. 12 embodiment includes a plurality of distributed alert agents AAU 70, 71, 72 which are located in three different networks N1, N2 and N3. When wishing to alert the customer, the second intermediary part 53 of ES instructs the alert agent to send an alert-signal in each of the networks N1, N2 and N3 in the same manner as that described above with reference to FIG. 6. This order is passed to the alert agents on different signal routes, represented by the broken-line arrow 73, 74, 75. The alert agents then send alert-signals to the customer U on one-way transmission. One or more of these alert-signals reaches U. In the illustrated case, the customer is reached by the alert-signal shown by the broken-line signal route 76. The customer U then contacts the nearest receptionist. The communication procedure then proceeds in the manner described with reference to FIG. 11.

The sequence alert ES→U and the call U→ES in response to the alert can be carried out in two mutually independent networks, for example the paging network and the telephone network. When independent networks are used, ES is able to page U via different terminals and U is able to use any selected terminal when the call U→ES is to be made. When it is necessary to make the sequence alert ES→U and the call U→ES must be made in one and the same network, for instance, in the telephone network, it is not possible for the alert ES→U and the call U→ES to be made independently. From a model aspect, the alert ES→U, e.g., a buzzing sound in the telephone apparatus, is considered as an alert from an alert agent AAU to U. If U answers the telephone, this activity is detected by AAU and is considered from a model aspect as though the alert agent AAU instructs a receptionist REC to deal with the connection that is then created (when U lifts the telephone receiver). All procedures from this receptionist REC and inwardly in the network (towards the intermediary ES) functions in the same way as that described with reference to FIG. 12.

In all of the Figures hitherto described, the signal routes are shown in broken-line arrows. However, a signal route need not imply a direct connection between two nodes or a connection internally within a node, but may also imply a connection between two nodes which are connected to a common network, or even to a signal route which is established between a node in a first network, this node being connected through a gate-way with a node in another network in the same manner as that described in copending U.S. patent application No. 08/018,214.

Figure 13:
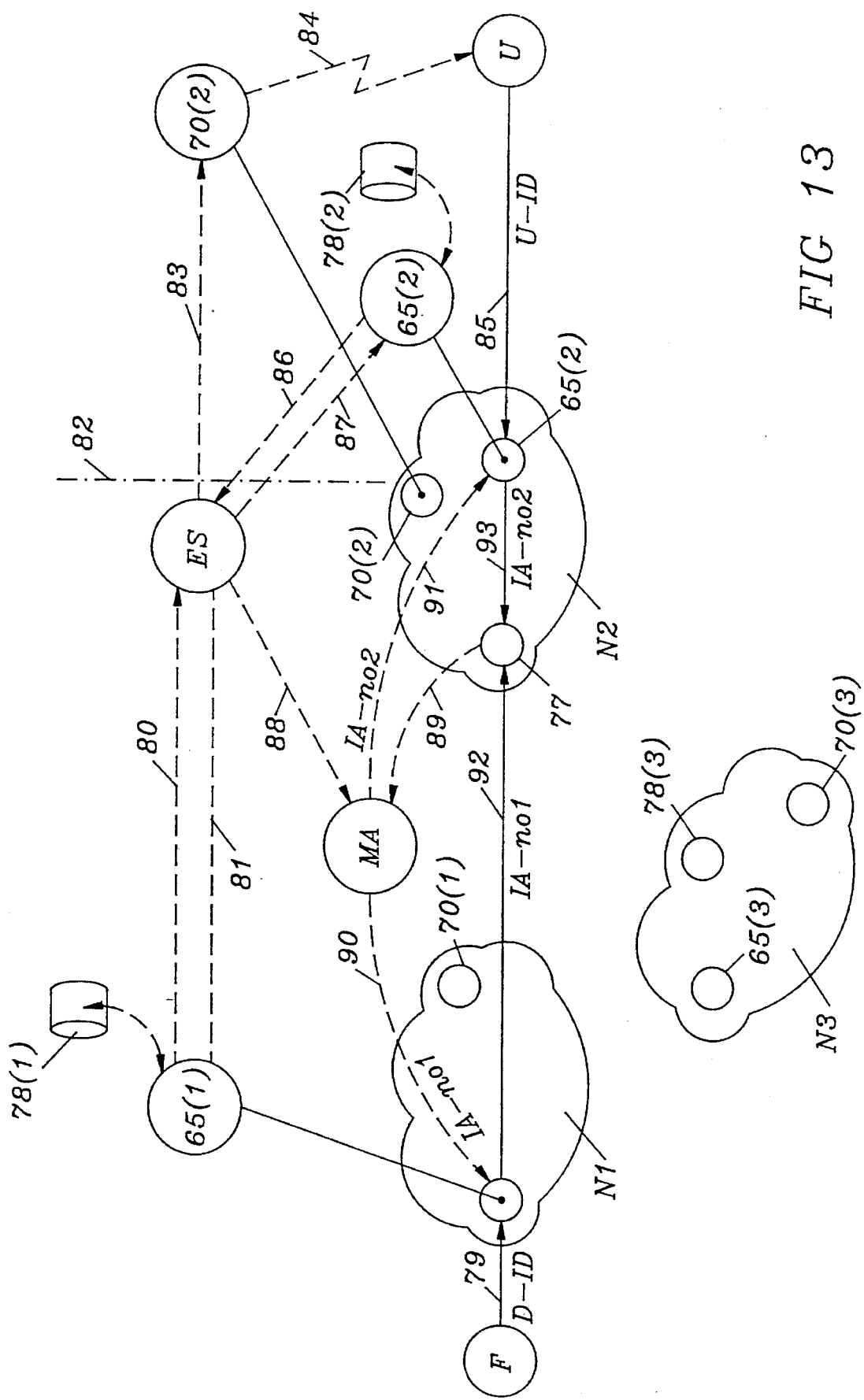
FIG. 13 is an overall view of the general environment in which a developed embodiment of the invention is applied.

FIG. 13 is an overall view which illustrates the general environment in which the invention is applied. The Figure shows three telecommunication networks N1, N2, N3 in each of which the customer U has a receptionist 65(1), 65(2), 65(3) and an alert agent (70(1), 70(2), 70(3). In the illustrated example, the customer intermediary ES is located stationarily in the network N2, but for the sake of simplicity is shown slightly above the "cloud-like" network N2. For the sake of simplicity, the receptionist 65(1) and the alert agent 70(2) have also been drawn on a level with the intermediary ES, slightly upwards in FIG. 13. The FIG. 13 illustration also includes a functionality designated NA, which represents a meeting arranger of the kind described in copending patent application having No. 08/018,214 and entitled "A method of establishing a connection". Also included in the network N2 is a node 77 in which there is found a switch, which may be a circuit-coupled switch or a packet-coupled switch, depending on the type of connections used in the network N2. Finally, the illustration also includes a number of databases 78(1), 78(2) and 78(3). These databases include information as to in which networks the intermediaries of different customers are found and the access ports to respective intermediaries. This information, or data, is listed in tables. A receptionist has access to the tables of the databases. A receptionist is connected to each network and has a given service, among other things, receives incoming calls from foreign users F and ensures that each incoming call is served. A foreign user F makes a call and gives the customer's D-ID as the destination address. The call is routed through the network N1 on a connection 79 and arrives at the receptionist 65(1). The receptionist looks in the tables of its database 78(1) to find the intermediary of the customer called. The receptionist then contacts the customer intermediary ES to find out how the call shall be dealt with. This enquiry is effected over a signal route symbolized by the broken-line arrow 80. The intermediary answers the receptionist's question on the basis of those instructions previously given to the intermediary by the customer U and the answer is sent back to the receptionist over the signal network. The answer is symbolized by the broken-line arrow 81. The receptionist now carries out a dialogue with the foreign user over the incoming connection 79 and delivers the service that the call requires. The next step is for the receptionist 65(1) to transmit some form of assignment or information to the intermediary ES, via the aforesaid signal route 80. Two different sets of circumstances can now occur, namely that the intermediary requires further instructions from its customer or that the intermediary can deal with the incoming call immediately. These two circumstances are represented schematically by the chain line 82. If it is unnecessary for the intermediary to obtain further instructions, no measures need be taken and no signalling to the right of the arrow 82 will take place, and instead the intermediary deals with the call and delivers the service that has been "agreed" between the intermediary and the customer U. When the intermediary requires further instructions from its customer, or has been instructed to contact the customer, the intermediary sends an instruction to the alert agent 70(2), as indicated by the broken-line arrow 83. The alert agent 70(2) then sends an alert to the customer, as represented by the broken-line arrow 84. In the preferred embodiment, this alert can be transmitted over a paging system having a wide covering area, e.g., extends throughout the country. The alert-signal is intended solely to alert the customer to the fact that something has happened and that he should contact his intermediary. The customer now calls his intermediary while using the "secret" access port, i.e., U-ID. The call is symbolized by the full-line arrow 85. The call arrives at a receptionist 65(2) in the network N2 and the receptionist checks its database 78(2) in order to ascertain the whereabouts of the intermediary associated with the destination address given in the incoming call. The receptionist 65(2) finds that the access port called is "secret" and that it is therefore the customer who calls and wishes to come into contact with his intermediary. The receptionist sends an alert to the intermediary, represented by the broken-line arrow 86. The intermediary ES enquires of the receptionist the purpose of the alert, represented by the broken-line arrow 87, and the receptionist informs the intermediary ES that the customer wishes to contact his intermediary. Communication can now take place between the customer U and the intermediary ES with the receptionist as the intermediate part. If the customer U decides that a connection shall be established with the foreign user F, the customer sends a corresponding instruction to the intermediary, over the connections 85, 86. In response, the intermediary ES transmits a meeting order to the meeting arranger MA, as indicated by the broken-line arrow 88. The manner in which the meeting arranger operates is described in more detail in copending patent application Nos. 08/018,214 and 08/018,223. The meeting arranger allocates the meeting place to the node 77 and collects two IA-numbers from this node, as indicated by the broken-line arrow 89. These IA-numbers are described in more detail in our copending patent application No. 08/018,268. The meeting arranger sends one of these IA-numbers, IA-nr1, to the receptionist 65(1), as indicated by the broken-line arrow 90, and sends the other of said IA-numbers, IA-nr2, to the other receptionist 65(2), as indicated by the broken-line arrow 91. The receptionist 65(1) then calls the node 77 while disclosing the IA-nr1 and internally connects the incoming call 79 referenced F-REC-ID with the port from which the call leaves. A connection with the node 77 is established in this way. This connection is represented by the full line 92. In a similar manner, the receptionist 65(2) establishes a connection with the node 77, represented by the full line 93, and internally connects that port which has the connection 85 and which has the reference U-ID with that port from which the connection 93 leaves, or originates. Those ports in which the call 92 and the call 93 originate are then connected together in the node 77. The connection between the foreign user F and the customer U is now established, this connection taking the form of a meeting which is placed in the node 77. When indirect contact shall be established between the foreign user F and the customer U, the foreign user has a message to deliver to the intermediary ES, which therewith stores the message. Alternatively, the foreign user F stores the message in some other place in the network N1 and informs the intermediary ES the address of the storage place in the network and also provides a reference, called L-REF, to the specific message. After having received the alert 84, the customer U orders the message to be collected, in accordance with the arrows 85, 86, 87, informing the intermediary of the storage location and the customer reference L-REF, and the customer can then choose between either collecting the message himself or can instruct the intermediary to collect the message and pass it on to the customer.

It will be apparent from all of the cases described above with reference to FIG. 13 that the intermediary ES is stationary in a network and that an intermediary can be stored anywhere in the network. All that the intermediary need know is the storage location of the message together with the reference L-REF of the specific message. The customer U can pluck the message from the storage location from any point whatsoever in any network whatsoever, provided that the customer possesses the aforesaid reference L-REF together with the information disclosing the message storage location, i.e., a storage-location destination address. When the customer U is found in the same network as that in which the message is stored, the intermediary calls the storage location with the aforesaid destination address. On the other hand, when the message is stored in a network other than the network in which the customer U is found when the customer wishes to collect the message, it is necessary that conversion equipment is found between the customer's network and the network in which the message is stored. Those mechanisms which control such conversion equipment are found described in copending patent application No. 08/018,268.

Figure 14:
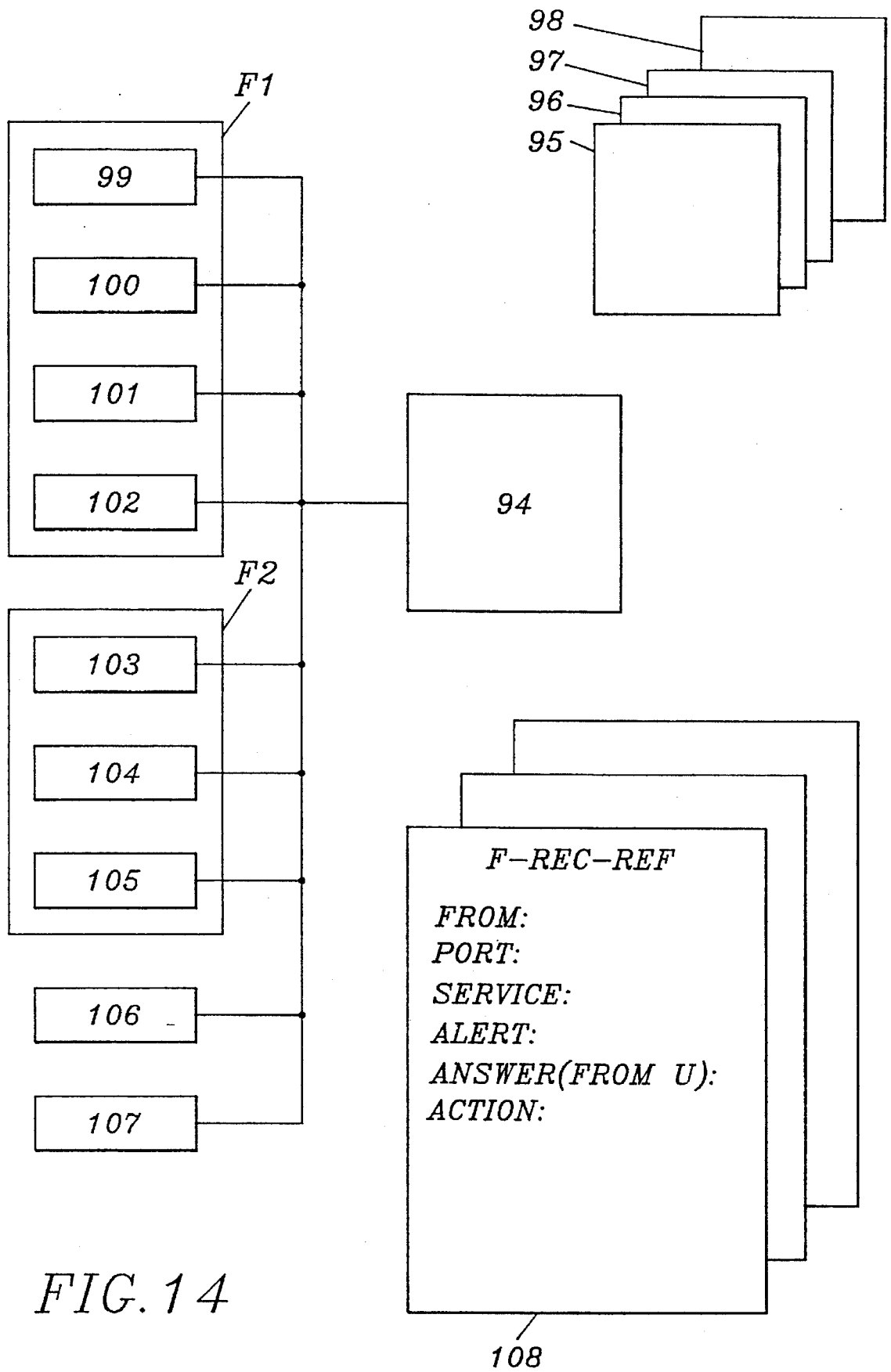
FIG. 14 is a block schematic illustrating the intermediary.

FIG. 14 is a block schematic illustrating an intermediary ES. The intermediary includes a computer 94 which is controlled by different programs 95, 96, 97, 98. The programs coact with the computer and with first functionalities F1 in the form of means 99 for indicating the type of signals with which the call is effected, and selector means for selecting corresponding communication equipment, speech information equipment 100, a telephone answering device 101 and equipment for communicating with electronic post 102 and other conventional communication means not shown. These functionalities 99–102 are intended for communication with foreign users. Correspondingly, other functionalities F2 for communication of the intermediary with the user U are also found, in the form of a modem 103, speech information equipment 104 and equipment for communication with mobile telephony 105. When the intermediary communicates with a receptionist via only one signal network, e.g., a data communication network, the intermediary includes a functionality for such communication, namely equipment 106, e.g., a modem. When the intermediary uses an alert agent, e.g., an alert agent in solely one communication network, namely the data communication network, there is also provided equipment 107, e.g., a modem, which has the functionality for such communication. According to the preferred embodiment of the invention, these functionalities are found on the service plane and thus need not be placed physically in those nodes in the various networks in which the intermediary ES is found.

The program 95 cooperates with the first functionalities F1 for receiving incoming calls and recording these calls and assigning an identification reference F-REC-REF to the call concerned. According to one preferred embodiment of the invention, an incoming call will cause the software to create a connection individual 108 in the form of a record comprised of several fields, wherein the record is identified by the aforesaid identification or by a pointer which refers to F-REC-REF. The various records may, for instance, include information as to the address from which the call arrives, the service level at which the intermediary shall answer the call, whether or not an alert has been sent to the customer, receive instructions from the customer to the effect of the manner in which the call shall be dealt with, measures for establishing connections, etc. Thus, a record is created for each incoming call and this record is maintained and is not annulled until all parties, foreign user, customer and intermediary are in agreement that the communication shall be terminated. Either party can refer to the identity of the individual call throughout the existence of the record. The program section 96 includes software for alerting the customer with the aid of one of the functionalities F2, and the program section 97 includes software for establishing a connection between a foreign user and the customer U, and the software 98 may be another type of software intended for other services occurring between the customer and the intermediary.

Although not shown in FIG. 14, it will be understood that there may be placed between the first and the second functionalities F1 and F2 conversion equipment which functions to convert signals that, e.g., arrive on one telex network into signals which activate the speech information equipment 104, which discloses the text information that arrives on the telex network in the form of speech signals to the customer. Although not shown, other conversion equipment may be provided for conversion of signals from any one of the, e.g., networks N1, N2 and N3 whatsoever to any one, e.g., of the networks N1, N2 and N3 whatsoever.

The system may also include another functionality which is achieved by equipment which enables the intermediary to receive on one and the same physical line, although not simultaneously, speech signals, telex signals, data communication signals, telefax facsimile signals or other types of signals in accordance with other signalling protocol, such as signal analysis of the call signal, preferably its handshake signals, and the activation of corresponding software and hardware required for communication, once the signal type has been established.

Figure 15:
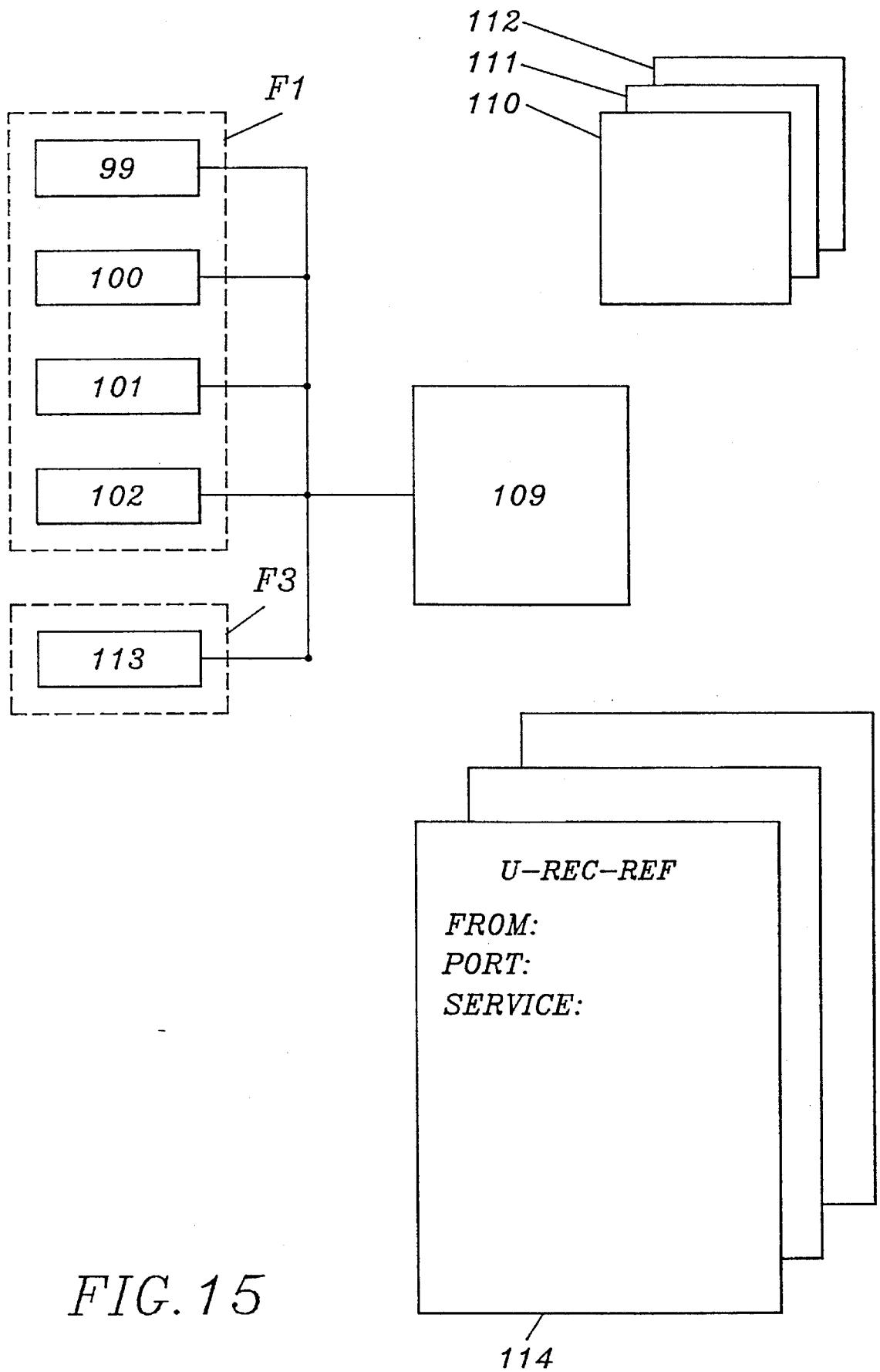
FIG. 15 is a block schematic of a geographically broken-out first part of the intermediary.

FIG. 15 is a block schematic illustrating a geographically isolated receptionist 65 included in the embodiments illustrated in FIG. 11. The receptionist is constructed principly in the same manner as the intermediary ES and includes a computer 109 which has a program 110 for receiving and recording incoming calls, a program 111 for transmitting alert signals to the intermediary ES, and a program 112 for establishing connections with the intermediary. The receptionist also includes functionalities similar to the functionalities F1 in FIG. 14, for communicating with foreign users, and a third functionality F3, e.g., a modem 113, for communication with the intermediary. This third functionality coacts with the program 111. For each incoming call, the computer 109 creates in the receptionist a connection individual 114, e.g., in the form of a record which includes a reference F-REC-REF, which connects the connection individual with the incoming call concerned, and also includes a field which discloses from where the call arrives, and also the port on which the call arrives, and further includes a field which discloses the level of service to be afforded the foreign user.

Figure 16:
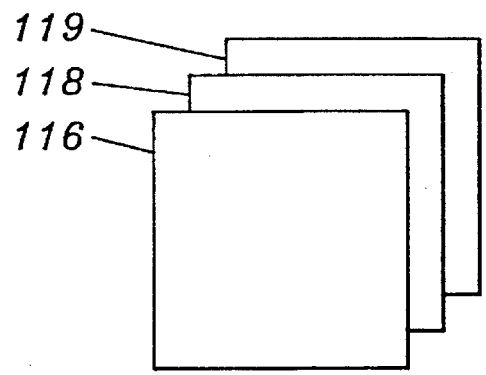
FIG. 16 is a block schematic illustrating a geographically broken-out second part of the intermediary.
Figure 16:
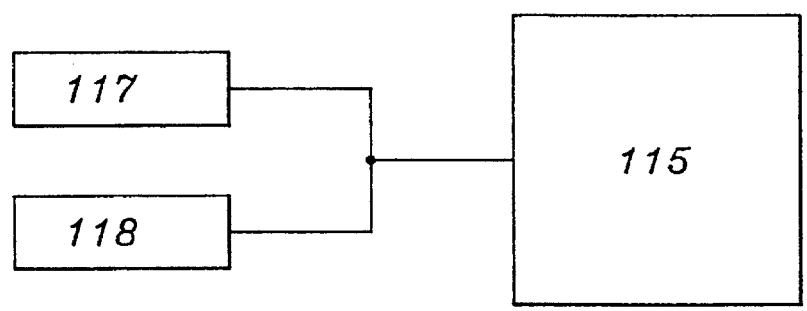
Figure 16:
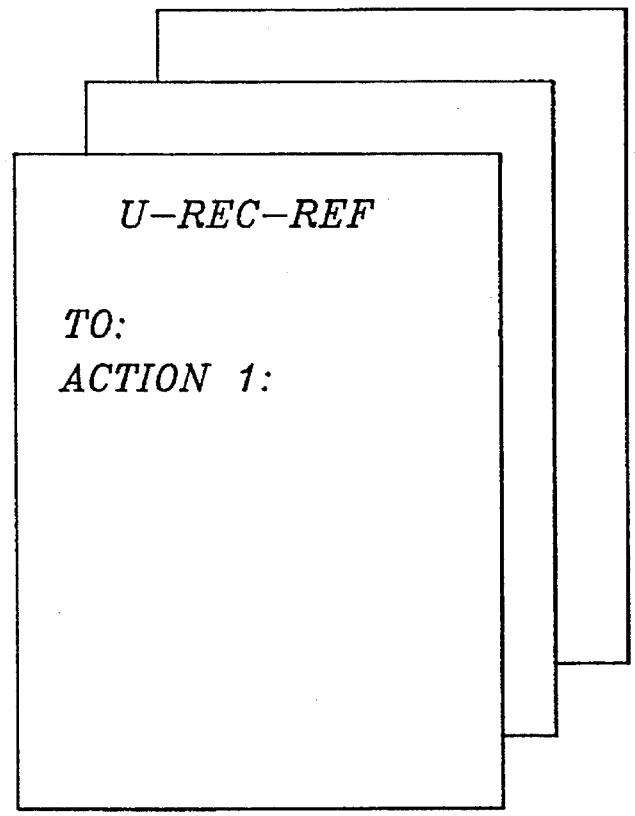

FIG. 16 is a block schematic illustrating a graphically isolated alert agent, for instance 70(2) which is constructed similarly to the receptionist, with the exception that the functionality for communication with foreign users is replaced with the functionality for one-way communication with the customer U, thus, in the present case, the functionality of paging in different networks. The computer in the alert agent is referenced 115 and coacts with software 116 for alerting the customer U via selected paging networks with the use of equipment 117 to this end, software 118 for recording incoming assignments from the intermediary ES, and software 119 for creating assignment individuals in response to an assignment incoming from the intermediary ES.

The hardware and software of the intermediary ES enable the intermediary to function as a personal electronic secretary to a number of different customers. In order to realize this multi-secretary function, the system further includes hardware and software for monitoring the access ports of respective customers.

A node may include the functionality of realizing receptionists and alert agents for many users.

It will be understood that the aforedescribed inventive embodiments may be modified and varied in many ways within the scope of the inventive concept. The example illustrated in FIG. 1 is not restricted to the illustrated number of networks and neither to the types of networks shown. More networks and other types of networks and other combinations of network types are conceivable.

I claim:

1. A system for supporting communication for a first user who wishes to be able to communicate with external users, comprising:

a first receptionist which is disposed in a first location for serving the first user;

a second receptionist disposed in a second location for serving external users who desire communication with the first user; and an intermediary which is in contact with the first and the second receptionists solely via signal connections, for detecting receptionist activities and for alerting the first user that the activity has occurred in one of the receptionists, said intermediary having equipment for serving said external users in accordance with instructions sent by the first user to the intermediary in response to said alert, wherein said first user has two addresses, a first address which is used by external users and a second address which is used by the first user to connect to the first receptionist.

2. A system according to claim 1, wherein an alert agent which is disposed at a third location situated between the intermediary and the first user for alerting the first user that the activity has occurred in one of the receptionists, upon receipt of an assignment from the intermediary over a signal connection.

3. A system according to claim 2, in which the external users have a plurality of telecommunication networks at their disposal, wherein each of said telecommunication networks includes at least one receptionist; and the intermediary has a plurality of terminals, each of which is connected to a respective port to each respective one of said telecommunication networks.

4. A system according to claim 3, wherein selective combinations of one or more actors chosen from among the group that is comprised of said receptionists said alert agent, said intermediary, said actors being co-localized in a common physical node.

5. A system according to claim 4, wherein the intermediary includes a first functionality for communication with external users over first telecommunication networks, and a second functionality for communication with the first user over second telecommunication networks; wherein said address is an address or destination of the intermediary; and the first user has a second address or destination which is separate from the first address and which leads to the intermediary.

6. A system according to claim 5, wherein the intermediary includes a computer having software for
  receiving and recording incoming calls in cooperation with the first functionality;
  producing a customer alert in coaction with said second functionality; and
  initiating a connection between the first user and an external user in coaction with the first and the second functionalities.

7. A system according to claim 6, wherein the first functionality includes signal-type identifying means which function to identify the type of signals with which the call is made and selector means for selecting corresponding communication equipment for the external user.

8. A system according to claim 7, wherein a receptionist includes a first computer having the said first functionality for communication with external users and a third functionality for communication with the intermediary.

9. A system according to claim 8, wherein an alert agent includes a second computer with equipment and software for alerting the first user.

10. A system according to claim 9, wherein a plurality of alert agents are disposed in a number of said networks.

11. A system according to claim 2, wherein the intermediary contains a directory of external user destination addresses in different networks; and there is used a common short-address for the different destination addresses in different networks over which an individual external user has at his disposal, the first user referring to this common short-address.

12. A method of supporting communication for a first user who desires the possibility of communicating with external users, said communication in the direction of the first user taking place via an intermediary which communicates as a receiving party in relation to the external users, comprising the steps of:

sending predetermined instructions to said intermediary from said first user;

following a predetermined procedure in accordance with some of said predetermined instructions for connecting a call from a external user to said first user; and establishing communication between said first user and said intermediary in accordance with other predetermined instructions so that said first user can take a dynamic stand as to how to deal with incoming calls, wherein in an environment in which communication can take place via several different telecommunication networks, the first user in each telecommunication network has at least one address, referred to as the first address, which is used by an external user when making a call to said first user;

calls which utilize the first address instead of being terminated by the first user are terminated by the intermediary that is associated with the first user;

the first user communicates with external users via the intermediary using a second address which is different from the first address, the intermediary communicates with external user over first telecommunication networks and with the first user over other telecommunication networks, of which some may be identical to the first network.

13. A method according to claim 12, wherein when called by an external user, the intermediary performs the following steps;

stores an identification that is related to the call;

alerts the first user over one of the second telecommunication networks to the effect that a call has arrived; and in that in response to this alert, the first user calls the intermediary in order to ask why the alert has been sent and provides instructions as to how the call shall be dealt with.

14. A method according to claim 13, in which the alert shall be understood by the first user as an alert to the effect that something has happened, wherein the intermediary requests instructions as to how the call shall be dealt with; and the intermediary reacts in accordance to the instructions given.

15. A method according to claim 14, wherein the first user chooses his instructions from among the instruction group which comprises ordering the intermediary:

to immediately establish communication with the external user over one of the first telecommunication networks; and to deliver a predetermined message to the external user without establishing immediate communication with said foreign user.

16. A method according to claim 15, wherein the first user has two addresses of which said at least one address is known to the external users, whereas the remaining address is known only to the first user and is used by the first user when calling the first user's intermediary.

17. A method according to claim 16, wherein said two addresses lead to the intermediary.

18. A method according to claim 17, wherein when the first user wishes to call an external user, said first user calls his intermediary over a selected network while using the second address in the selected network;

the first user informs his intermediary of the network in which the desired communication with the external user shall take place; and the intermediary initiates the establishment of a connection with the external user in response to said call.

19. A method according to claim 18, in which the intermediary has several access ports in one and the same telecommunication network, wherein the intermediary is divided and serves several customers simultaneously.

20. A method according to claim 19, in which an external user communicates through its own intermediary, wherein the external user intermediary and the first user intermediary communicate mutually on behalf of its respective customer.

21. A method according to claim 20, wherein initiation of the desired communication is effected by either of the intermediaries contacting a meeting broker.

22. A method according to claim 12, in which the intermediary has a first part for communication with external users and a second part for communication with the first user, wherein the first part of the intermediary is distributed; and in that the distributed parts, here called receptionists, communicate with the first part of the intermediary over signal routes.

23. A method according to claim 22, wherein the receptionists are placed in locations which are geographically isolated from the location at which the intermediary is found.

24. A method according to claim 23, wherein when the first user is located temporarily in a place other than his normal place of domicile, the first User takes his intermediary with him.

25. A method according to claim 24, wherein external users located in the normal place of domicile are served by receptionists which are located in the vicinity of said normal place of domicile;

the receptionists are disposed in different telecommunication networks; and the receptionists are in contact with the intermediary at the temporary place of residence of the first user.

26. A method according to claim 25, wherein receptionists are disposed in different geographical locations and in different networks; and all receptionists communicate with the second part of the common intermediary.

27. A method according to claim 26, wherein the second intermediary part is distributed;

the distributed second intermediary parts, here called alert agents, communicate with the second intermediary part over signal routes and the alert agent alerts the first user.

* * * * *